(12) United States Patent
Adelman

(10) Patent No.: US 12,164,483 B2
(45) Date of Patent: *Dec. 10, 2024

(54) NESTED MEDIA CONTAINER, PANEL AND ORGANIZER

(71) Applicant: XRDNA, Las Vegas, NV (US)

(72) Inventor: Charles Nathan Adelman, Irvine, CA (US)

(73) Assignee: XRDNA, Las Vegas, NV (US)

(*) Notice: Subject to any disclaimer, the term of this patent is extended or adjusted under 35 U.S.C. 154(b) by 227 days.

This patent is subject to a terminal disclaimer.

(21) Appl. No.: 16/996,582

(22) Filed: Aug. 18, 2020

(65) Prior Publication Data

US 2020/0379959 A1 Dec. 3, 2020

Related U.S. Application Data

(63) Continuation of application No. 15/806,166, filed on Nov. 7, 2017, now Pat. No. 10,789,218, which is a (Continued)

(51) Int. Cl.
*G06F 16/21* (2019.01)
*G06F 16/174* (2019.01)
(Continued)

(52) U.S. Cl.
CPC ............ *G06F 16/21* (2019.01); *G06F 16/174* (2019.01); *G06F 16/211* (2019.01); *G06F 16/22* (2019.01);
(Continued)

(58) Field of Classification Search
CPC ...... G06F 19/00; G06F 19/328; G06F 19/321; G06F 19/3418; G06F 19/3456;
(Continued)

(56) References Cited

U.S. PATENT DOCUMENTS 5,910,987 A * 6/1999 Ginter ................... H04L 63/083
705/52
5,915,019 A * 6/1999 Ginter ..................... H04L 63/16
705/26.1

(Continued)

*Primary Examiner* — Sheree N Brown
(74) *Attorney, Agent, or Firm* — K2T3 PLLC

(57) ABSTRACT

A method for the organizing, managing, mapping, distributing, transportation and displaying of multi-layered content and/or data in a tactile volumetric (three-dimensional), flat (two-dimensional) and/or multi-dimensional container and/or panel which functions as a macro controller through tactile, sensatory, audible and/or other forms of user control. This includes the means to manipulate content and/or data through a visual and/or multi-sensory interface that stores content and media in a nested and sub-nested hierarchical container and sub-container array which can give real-time feedback to any involved party. These containers and/or panels provide a means to permanently move and validate content between servers, devices and/or users, while giving a real-time visual and/or multi-sensatory response and representation to that user. This system also provides a means to ingest and convert legacy media formats.

19 Claims, 21 Drawing Sheets

Related U.S. Application Data continuation of application No. 14/259,623, filed on Apr. 23, 2014, now Pat. No. 9,842,125.

(60) Provisional application No. 61/815,331, filed on Apr. 24, 2013.

(51) Int. Cl.

| | | |
|---|---|---|
| *G06F 16/22* | (2019.01) | |
| *G06Q 30/0242* | (2023.01) | |
| *G06Q 30/0251* | (2023.01) | |
| *H04L 9/40* | (2022.01) | |

(52) U.S. Cl.
CPC ..... *G06Q 30/0242* (2013.01); *G06Q 30/0264* (2013.01); *H04L 63/0428* (2013.01); *H04L 63/0861* (2013.01); *H04L 2463/082* (2013.01)

(58) Field of Classification Search
CPC ............... G06F 19/324; G06F 19/3462; G06F 19/3481; G06F 19/325; G06F 3/04842; G06F 19/3475; G06F 11/302; G06F 11/3409; G06F 16/13; G06F 16/22; G06F 16/2219; G06F 16/254; G06F 16/313; G06F 16/335; G06F 16/532; G06F 16/954; G06F 16/986; G06F 19/326; G06F 19/3468; G06F 19/36; G06F 21/41; G06F 21/602; G06F 21/6227; G06F 21/6245; G06F 21/6254; G06F 3/0481; G06F 3/0484; G06F 3/04845; G06F 3/04847; G06F 3/0488; G06F 3/04883; G06F 3/04886; G06F 3/147; G06F 40/30; G06F 9/542; G06F 16/21; G06F 16/174; G06F 16/211; G06Q 30/0242; G06Q 30/0264; H04L 63/0428; H04L 63/0861; H04L 2463/082
USPC ........................................................ 707/822
See application file for complete search history.

(56) References Cited

U.S. PATENT DOCUMENTS

| | | | | |
|---|---|---|---|---|
| 5,917,912 A * | 6/1999 | Ginter | ................... | G06Q 20/123 |
| | | | | 705/40 |
| 5,949,876 A * | 9/1999 | Ginter | ................... | H04L 9/3247 |
| | | | | 375/E7.009 |
| 5,982,891 A * | 11/1999 | Ginter | ............. | H04N 21/44204 |
| | | | | 375/E7.009 |
| 6,237,786 B1 * | 5/2001 | Ginter | ................ | H04N 21/8166 |
| | | | | 375/E7.009 |
| 6,253,193 B1 * | 6/2001 | Ginter | ................... | G06Q 10/087 |
| | | | | 705/52 |
| 6,363,488 B1 * | 3/2002 | Ginter | ............. | H04N 21/44204 |
| | | | | 375/E7.009 |
| 6,389,402 B1 * | 5/2002 | Ginter | ................... | G07F 9/026 |
| | | | | 705/37 |
| 6,427,140 B1 * | 7/2002 | Ginter | ................... | H04L 9/3247 |
| | | | | 713/193 |
| 6,640,304 B2 * | 10/2003 | Ginter | ................... | G06Q 40/12 |
| | | | | 375/E7.009 |
| 7,051,212 B2 * | 5/2006 | Ginter | ................... | G06Q 20/14 |
| | | | | 380/231 |
| 7,076,652 B2 * | 7/2006 | Ginter | ................... | H04L 9/0861 |
| | | | | 713/153 |
| 7,100,199 B2 * | 8/2006 | Ginter | ................... | H04L 63/123 |
| | | | | 380/231 |
| 7,917,749 B2 * | 3/2011 | Ginter | ................ | H04N 21/8166 |
| | | | | 713/168 |
| 8,006,087 B2 * | 8/2011 | Ginter | ................... | G06Q 20/14 |
| | | | | 380/231 |
| 8,112,625 B2 * | 2/2012 | Ginter | ................... | H04N 21/443 |
| | | | | 713/150 |
| 8,543,842 B2 * | 9/2013 | Ginter | ................... | H04N 21/835 |
| | | | | 380/225 |
| 8,572,411 B2 * | 10/2013 | Ginter | ................ | G06Q 30/0601 |
| | | | | 345/59 |
| 8,799,249 B2 * | 8/2014 | Martinez | ................ | G06F 16/48 |
| | | | | 707/821 |
| 2002/0112171 A1 * | 8/2002 | Ginter | ................ | H04N 21/6581 |
| | | | | 375/E7.009 |
| 2002/0112180 A1 * | 8/2002 | Land | ................... | G06Q 10/10 |
| 2003/0088784 A1 * | 5/2003 | Ginter | ................ | G06Q 50/184 |
| | | | | 375/E7.009 |
| 2003/0105721 A1 * | 6/2003 | Ginter | ................... | H04L 63/123 |
| | | | | 713/193 |
| 2004/0103305 A1 * | 5/2004 | Ginter | ................ | H04L 63/0442 |
| | | | | 375/E7.009 |
| 2006/0174326 A1 * | 8/2006 | Ginter | ................... | H04N 7/162 |
| | | | | 726/3 |
| 2006/0212722 A1 * | 9/2006 | Ginter | ................... | G06Q 10/087 |
| | | | | 713/193 |
| 2006/0224903 A1 * | 10/2006 | Ginter | ................ | G06Q 30/0283 |
| | | | | 713/193 |
| 2007/0198534 A1 * | 8/2007 | Hon | ................... | G06F 16/44 |
| 2008/0222106 A1 * | 9/2008 | Rao | ................... | H04H 60/46 |
| 2009/0043652 A1 * | 2/2009 | Ginter | ................... | H04L 9/0861 |
| | | | | 705/14.69 |
| 2009/0132805 A1 * | 5/2009 | Ginter | ................... | G06Q 20/102 |
| | | | | 726/28 |
| 2009/0132815 A1 * | 5/2009 | Ginter | ................... | G06Q 30/06 |
| | | | | 713/164 |
| 2010/0205205 A1 * | 8/2010 | Hamel | ................ | G06F 16/9017 |
| | | | | 707/769 |
| 2010/0228996 A1 * | 9/2010 | Ginter | ................... | G06Q 50/184 |
| | | | | 726/28 |
| 2010/0328201 A1 * | 12/2010 | Marvit | ................... | G06F 3/0346 |
| | | | | 382/103 |
| 2011/0022520 A1 * | 1/2011 | Ginter | ................... | G06Q 20/24 |
| | | | | 705/51 |
| 2011/0022846 A1 * | 1/2011 | Ginter | ................... | H04L 63/16 |
| | | | | 713/168 |
| 2013/0162655 A1 * | 6/2013 | Mueller | ................... | G06T 13/00 |
| | | | | 345/474 |

\* cited by examiner

NESTED MEDIA CONTAINER, PANEL AND ORGANIZER

PRIOR APPLICATIONS

This application claims priority from Provisional Application Ser. No. 61/815,331, filed Apr. 24, 2013.

BACKGROUND OF THE INVENTION

Content, in its currently popular formats, including, but not limited to, streaming video, audio, images, articles, newspapers, magazines, periodicals, text books and blogs comprises a majority of the content that fills the world-wide-web and other user enabled networks. The concept of a portable media format, much like the VHS or DVD, has changed as different technologies and developers have created different ways to transport and distribute content and data. The contextuality of content is carried through search engines and social communities, but there is not a single multi-format container/panel and interface, that can be nested and brings these assets together into one organized multi-content deployable format.

BRIEF SUMMARY OF THE INVENTION

The inventive subject matter includes methods, processes and/or procedures to interconnect media through a content and/or data aggregation, delivery and search platform that unites the online magazine, social community, web radio, television formats, polygons and any other media format into a single portable package. These can be represented as channels and/or environments within panels or containers, which can then be pushed, pulled or broadcast into any current or future distribution platform, including, but not limited to, gaming consoles, web enabled televisions (smart TV), mobile devices, set-top boxes, wearable devices and computers.

DETAILED DESCRIPTION OF THE INVENTION

The following is a detailed description of the methods and apparatus for managing, manipulating and distributing content through a hierarchical nesting method and process. The system currently manages two forms of a wrapper format, and may be expanded to facilitate multi forms of wrapper format, which is a metafile format whose specification describes how different data elements and metadata coexist in a computer file. These initial wrappers, the Nested Media Container (NMC) and Nested Media Panel (NMP), work in conjunction with each other wherein the container (NMC) is the content and data management apparatus, and the panel (NMP) is the front-end user interface (UI) for viewing, manipulation and control of the content and data. Within this system, users can create customized brands as a specific channel type which will have a distinct digital thumbprint based on the contextual information of the data and metadata that form the content of that container or panel. This contextual meta-data is relayed back to online social communities, search engines and/or applications, so that each channel container's content is indexed and searchable.

Figure 1:
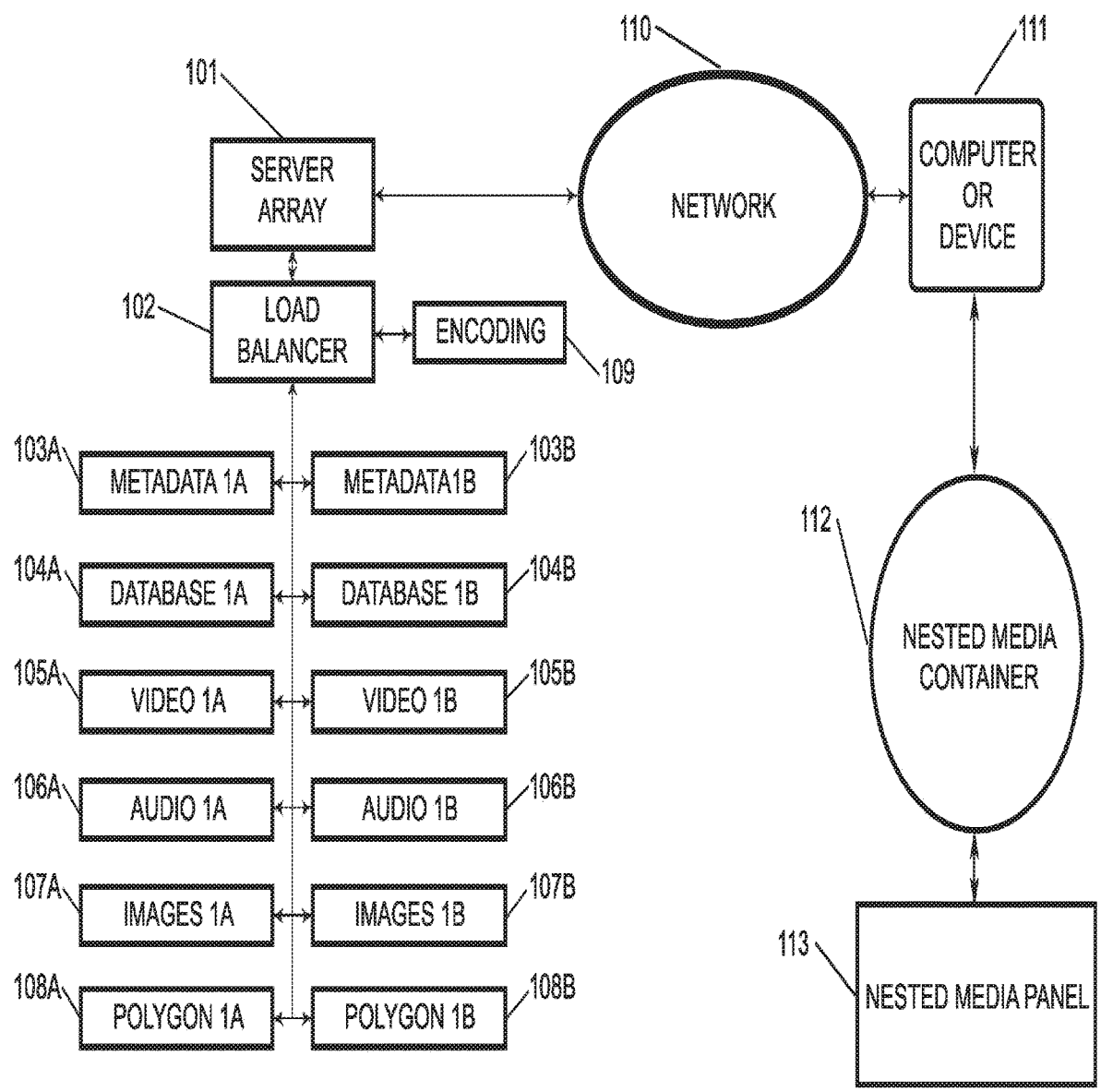
FIG. 1 is a network diagram of the content server array(s) and data fetch method and/or process to populate a media panel and/or container. This method uses a distinct server array in which data, metadata, content, video, audio, images, polygons and any other related data is segmented and decentralized onto specific server slices. This allows for a unique content archetype based delivery and authentication system.

The server side content delivery method, as illustrated in FIG. 1, involves an internally decentralized Content Delivery Network in which server hard drives, slices, partitions or segments are stored on clusters that hold that content archetype. 101 shows an example of an overall server array (both physical and virtual) in which a load balancer 102 (both physical and virtual) manages the content and data traffic as it passes through an internal network, through a public or private network to the end user. Directly attached to the load balancer is an encoding server 109 which handles the ingest, encoding and/or trans-coding of content into the server array. Content and data is then segmented into its designated server cluster and/or drive. 103A shows a metadata server, with a redundant clone of that server 103B, in which any metadata that is tethered to data and/or content extracted from outside sources (e.g., but not limited to, web, databases, metadata, content) is stored, managed and manipulated within this cluster. 104A and 104B house the databases for the server array. The content slices hold specific content archetypes on separate sections so that the server's resources are used efficiently, in essence holding and processing data at different system resource levels based on the needs of a specific content and data archetypes. The initial content and/or data types, including but not limited to, video 105A/105B, audio 106A/106B, images 107A/107B and polygons 108A/108B. This server array, and/or content distribution system, can be pushed, pulled or broadcast to any internal or external distribution point that will accept it, including, but not limited to, containers, panels, digital billboards, near-field and wi-fi transmissions to localized receivers, web/internet, print-on-demand, satellite, cable head-end or ISP, outside storage environment, physical or virtual distribution and ingest environment. This creates a unified distribution platform that is simple, lightweight on code, and nimble enough to work on a majority of current content distribution hardware solutions. This system can also be implemented on current set-top boxes that have an internet connection as a firm-ware and operating system update, replacing the channel itself with the Nested Media Container (NMC) or Nested Media Panel (NMP) user interface.

Figure 2:
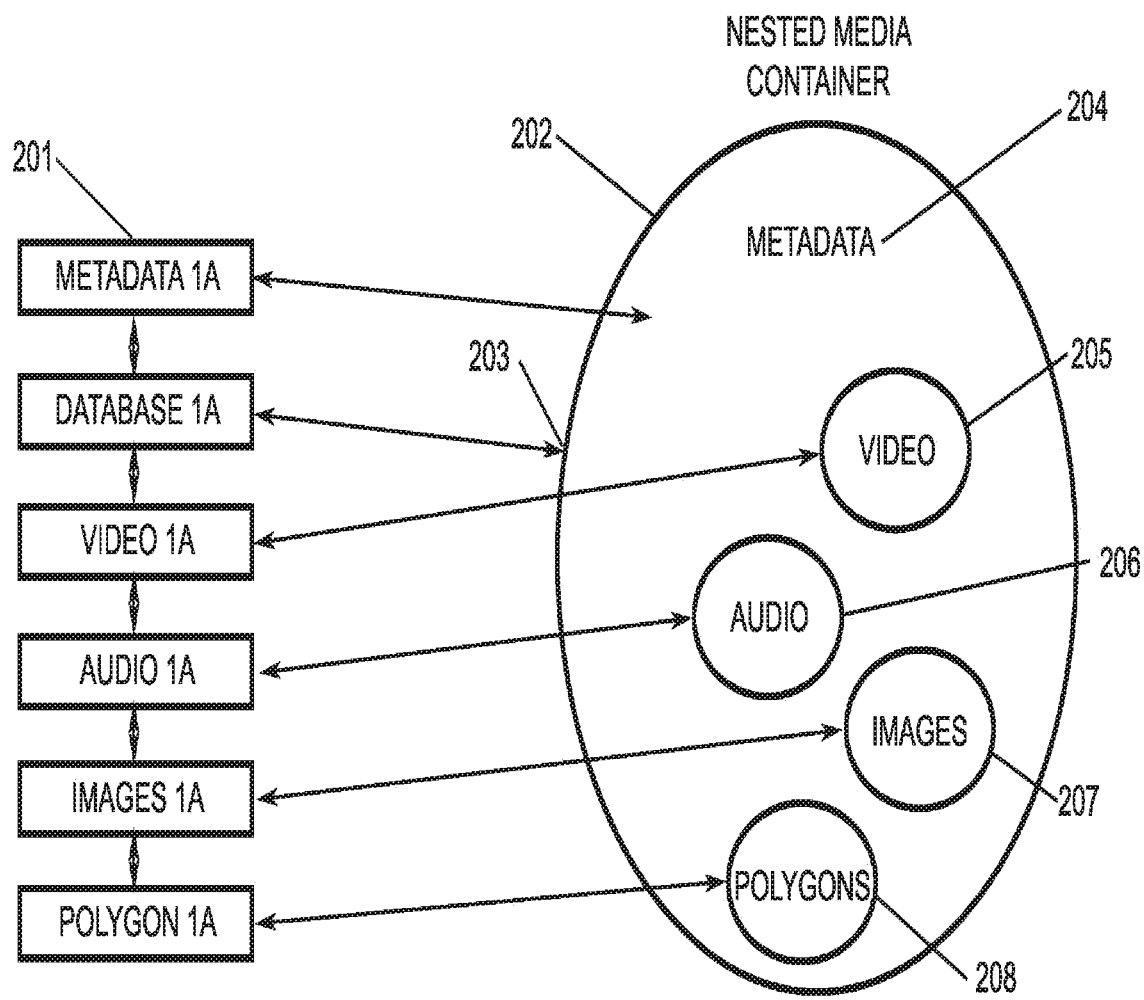
FIG. 2 is an example of content/data tethering between a Nested Media Container (NMC) and the server array, as well as the nesting component of an NMP.

FIG. 2 is an example of content/data tethering between a Nested Media Container (NMC) and the server array, as well as the nesting component of an NMP. 201 shows the server array as it pertains to the slices, drives and/or clusters that store, manage, manipulate, process, transport and/or deliver the content. 202 represents the entire NMC, where the container's shell is the outmost point at which data held within the container cannot move beyond, unless triggered to do so from an external and/or internal force, which can include, but is not limited to, merging with another container, data extracted from that container into another medium, ingest and/or organic functions triggering physical changes. 203 represents a tether link between the database(s) and the container's outer layer. This forms a bonded control mechanism that can include, but limited to, adjusting, changing, manipulating, deleting and/or migration of information within the database(s) whereas the outer layer becomes the master control mechanism to effect such variants. 204 shows how metadata becomes the "ether", or environment, in which any nested content and/or data archetypes sits within. This allows the metadata threads, from the server(s), array(s) or other sources, to effect the volume and size of a container based on the amount of information and content the metadata relates to. 205, 206, 207 and 208 represent, but not limited to, nested content and/or data containers in which data is managed, manipulated, controlled and relayed back to the server. This also allows nesting within nesting.

Figure 3:
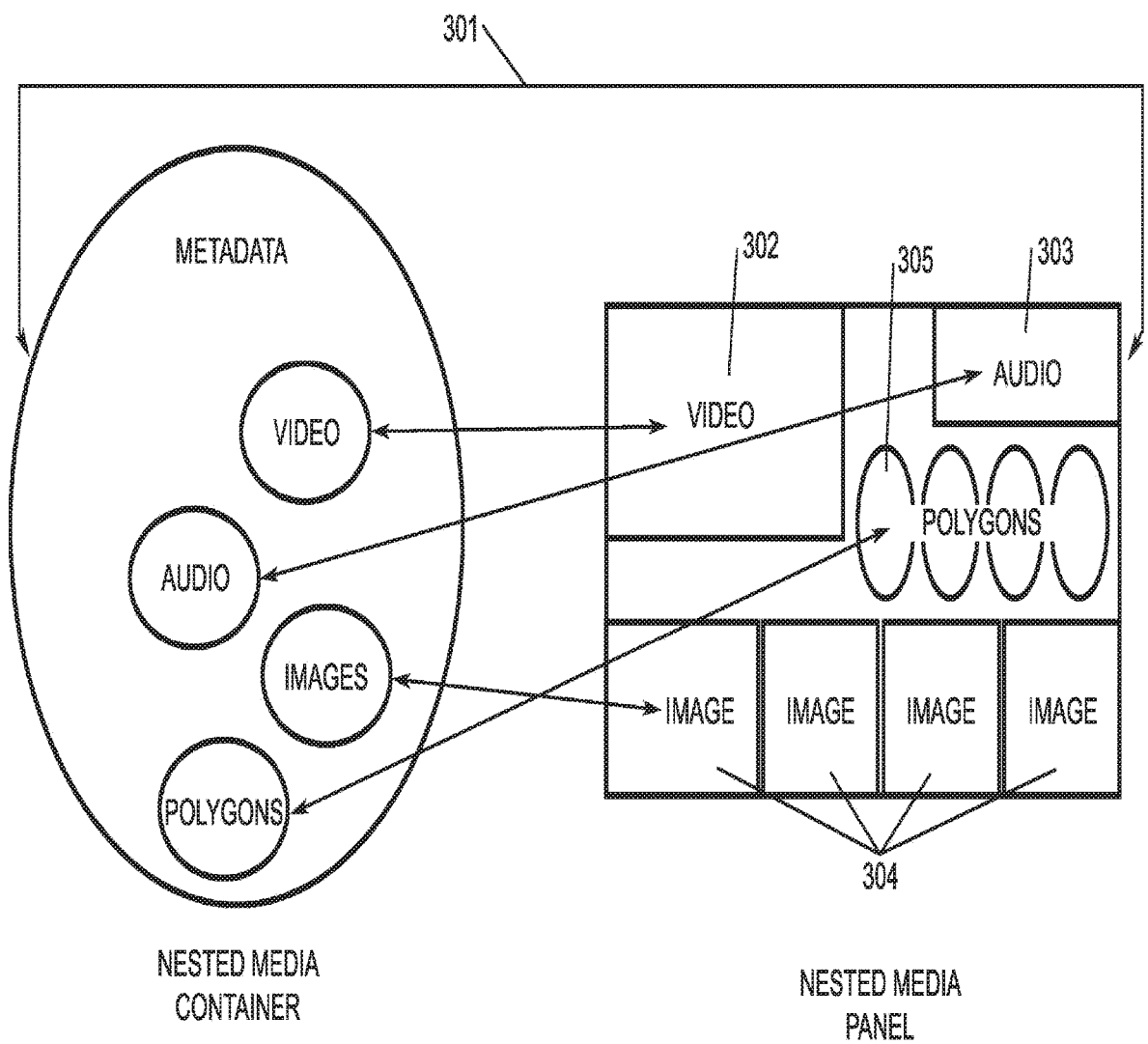
FIG. 3 illustrates the tethering process between a Nested Media Container (NMC) and Nested Media Panel (NMP), and how content based objects are nested within a panel interface. The container and panel share a unified data wrapper to create, manage and track relevant metadata links from source through viewer interactivity.

The process of tethering between a NMC and NMP is illustrated in FIG. 3. 301 shows the tethered link between the two or more container types, creating a management, manipulation and data exchange where any adjustment of, but is not limited to, information, metadata and/or content will affect any tethered container(s). 302 shows example of a link between a video container, held within the NMC, and the front-end user interface which populates the video content within the NMP. 303 shows an example of a link between an audio container, held within the NMC, and the front-end user interface which populates and plays the audio content within the NMP. 304 shows an example of a link between an image container, held within the NMC, and the front-end user interface which populates the images, both still and animated, within the NMP. 305 shows an example of the link between a polygon container, held within the NMC, and the front-end user interface(s) which populates the polygons within the NMP. Polygons can also represent content and/or data at the container level, bypassing the NMP as a user interface, and creating a direct container based polygon which can be skinned as almost any conceivable object that can be replicated as a polygon based model. When nesting panels and/or containers, the system initially looks for congruencies, similarities in metadata, content, audio, video, text, images and any other matching methods, procedures and/or processes to create inter-panel or inter-container threads that dictate how the new panel or container will show the content and/or data.

Figure 4:
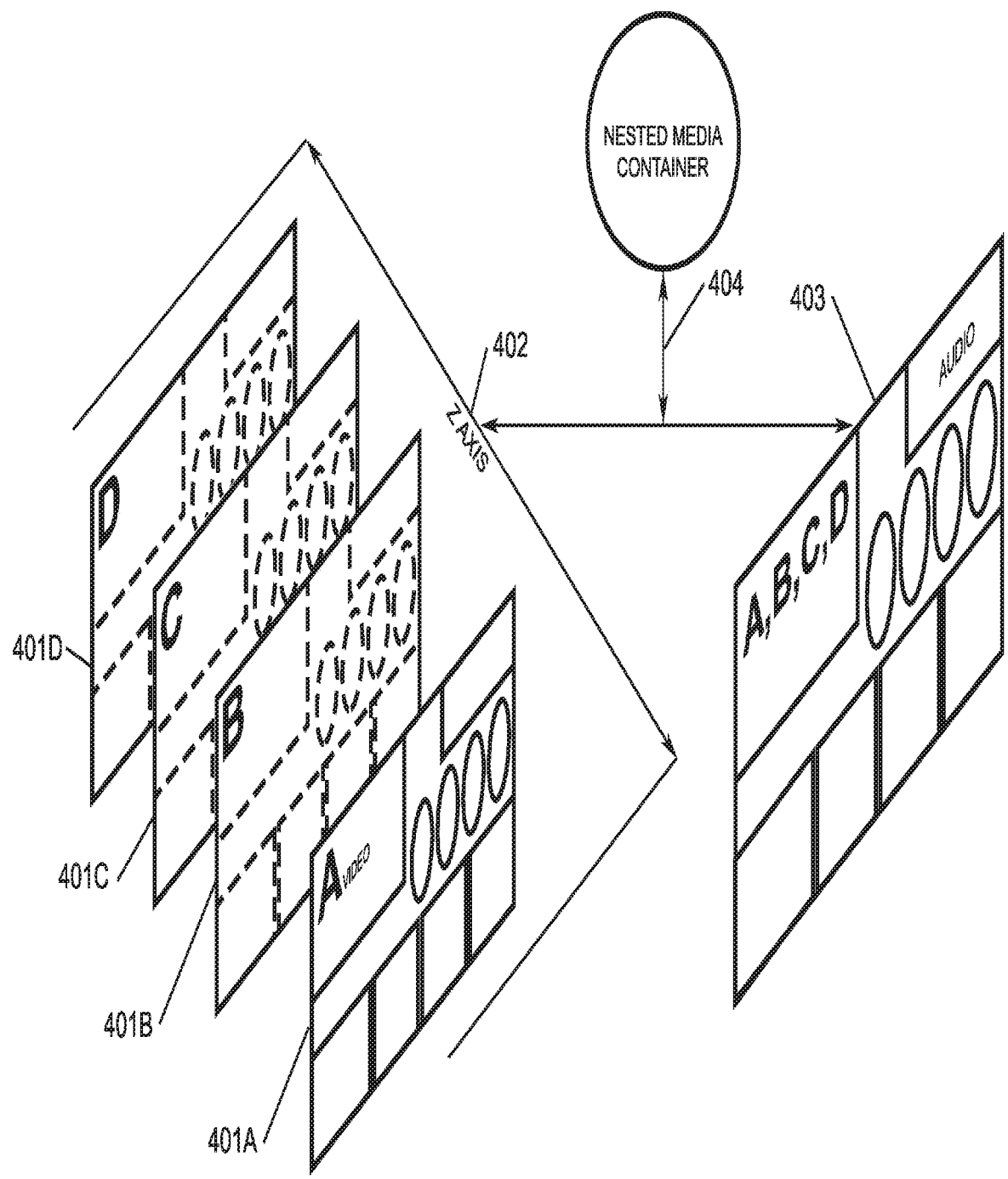
FIG. 4 illustrates the panel nesting process in Z axis space. A new panel is created from the nested panels, which retains the tethering relationship of those panels to a container.

FIG. 4 illustrates an example of the panel nesting process in Z axis space, where a new panel is created from the nested panels, which retains the tethering relationship of those panels to a container. 401A shows a front-facing panel and how the hierarchical stack, or nesting, of additional panels, 401B-401D, on the Z axis 402, creates a new combined panel state 403 in which content is nested based on several factors, including its hierarchical information. The method, process and/or procedure by which content and data/metadata is combined includes, but is not limited to, mathematical boolean expressions, parent/child relationships, value of data based on space between panels, adjustments of a panel in either X, Y or Z space, relationship of data within a container or panel and data adjustments based on time sequences. 404 shows the continual tethering of both the stack/nested panels and the combined content panel.

Figure 5:
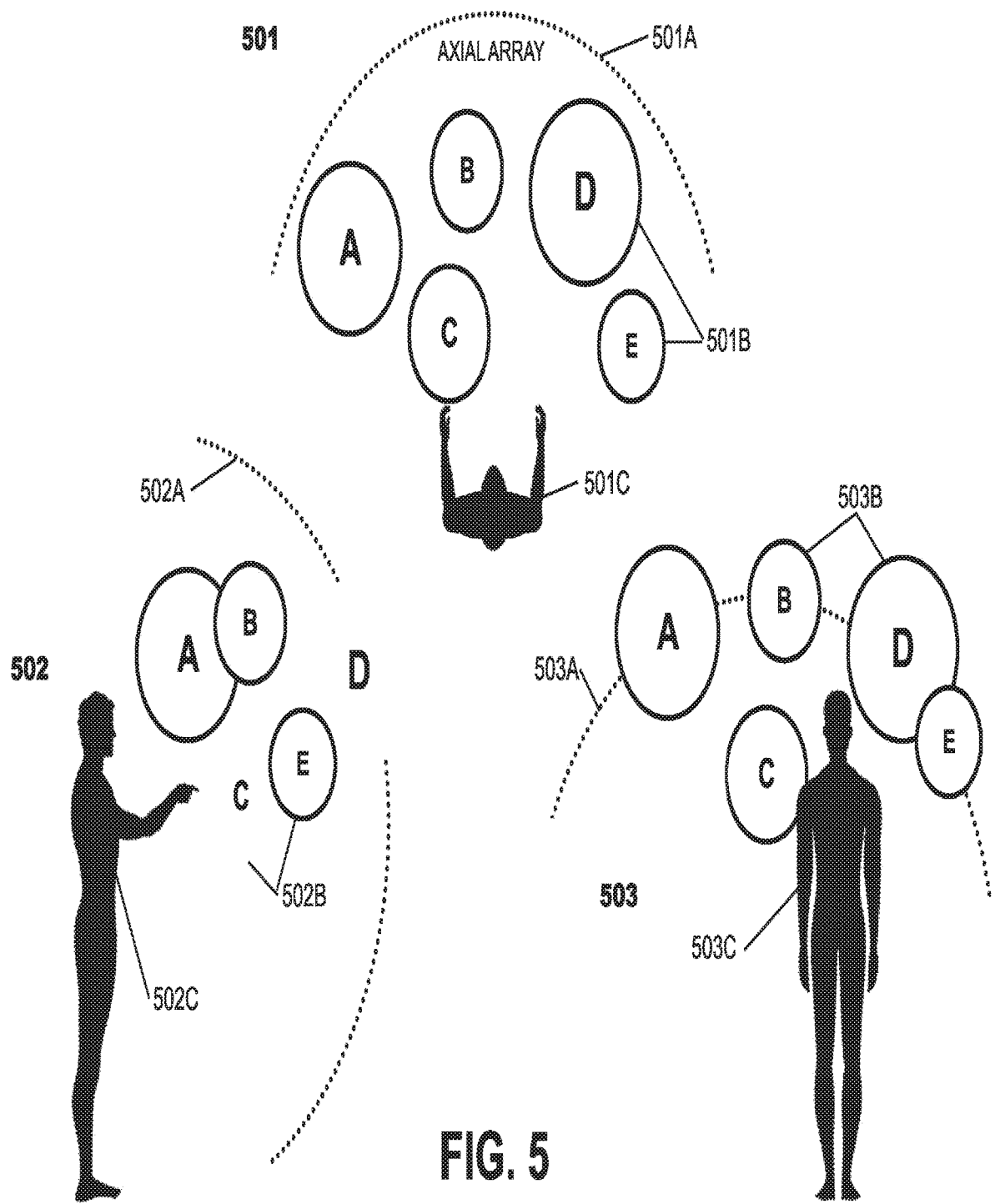
FIG. 5 illustrates an example of a user's tactile interaction with nested media containers in XYZ axial space as they relate to a user as the anchor and center of pivot.

Data and content interaction between a user (users) and the method, process and/or procedure of distribution and/or transportation have evolved to include, but is not limited to, heads-up displays, computer screens, augmented reality devices, mobile devices and holography. FIG. 5 illustrates an example of a user's interaction including, but not limited to, tactile, retinal and/or aural with virtual and/or physical Nested Media Containers (NMC) in XYZ axial space as they relate to a user as the anchor and center of pivot through any of the described methods. 501 illustrates a top view of a user's interaction with NMCs, wherein 501A shows an axial array as it relates to the user 501C, and how NMCs 501B can be controlled through, but not limited to, tactile interaction, gesture control, motion control, human input devices, audible control and/or any other method in which visual data can be manipulated and/or controlled. 502 shows the right side view of a user 502C interacting with the NMCs 502B and a prospective axial array path 502A. 503 shows a front view of a user 503C interacting with the NMCs 503B and a prospective axial array path 503A.

Figure 6:
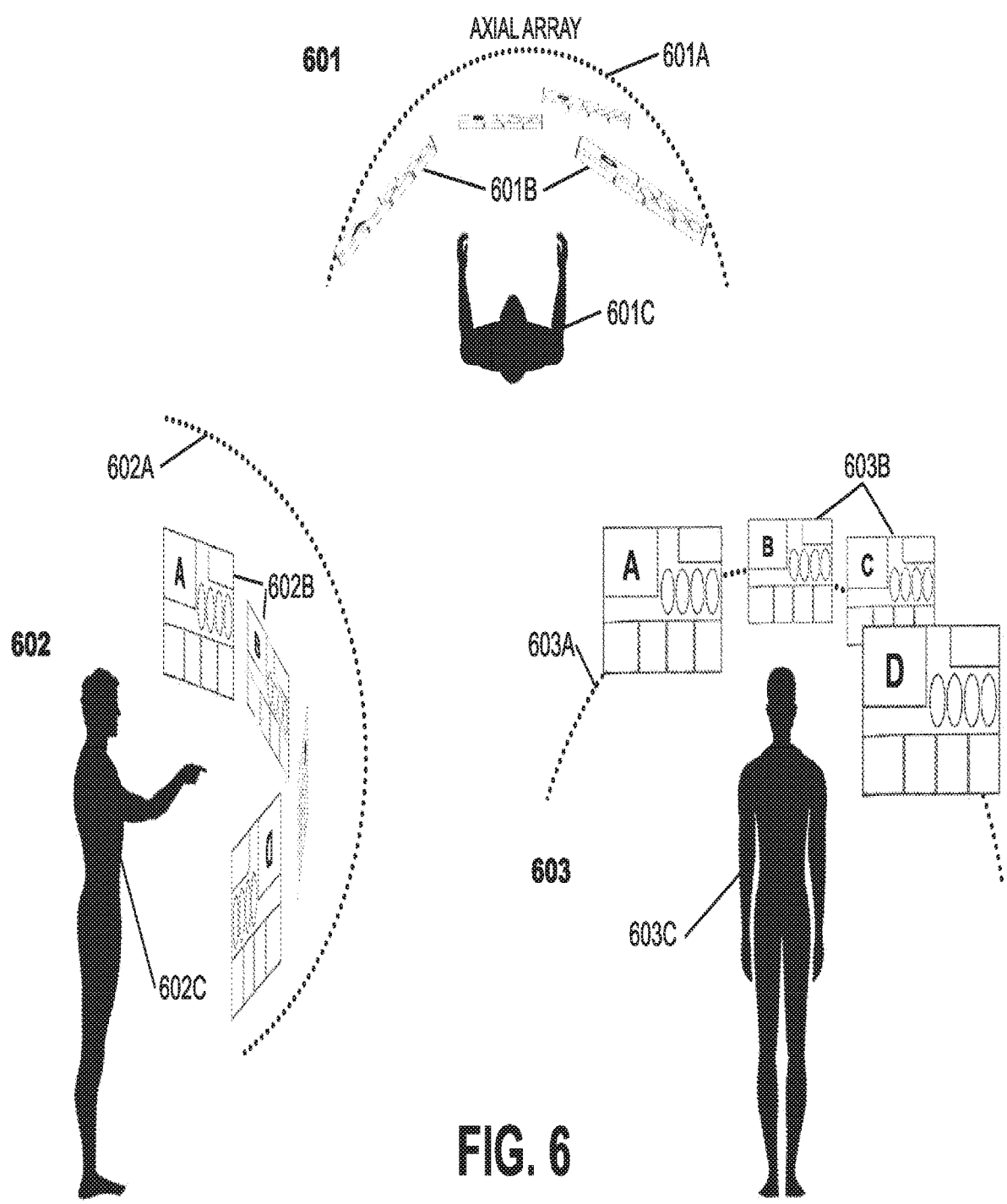
FIG. 6 illustrates an example of a user's tactile interaction with nested media panels in XYZ axial space as they relate to a user as the anchor and center of pivot.

FIG. 6 illustrates an example of a user's interaction including, but not limited to, tactile, retinal and/or aural with virtual and/or physical with Nested Media Panel (NMP) in XYZ axial space as they relate to a user as the anchor and center of pivot through any of the described methods. 601 illustrates a top view of a user's interaction with NMPs, where 601A shows an axial array, as it relates to the user 601C, and how NMPs 601B can be controlled through, but not limited to, tactile interaction, gesture control, motion control, human input devices, audible control and/or any other method in which visual data can be manipulated and/or controlled. 602 shows the right side view of a user 602C interacting with the NMPs 602B and a prospective axial array path 602A. 603 shows a front view of a user 603C interacting with the NMPs 603B and a prospective axial array path 603A.

Figure 7:
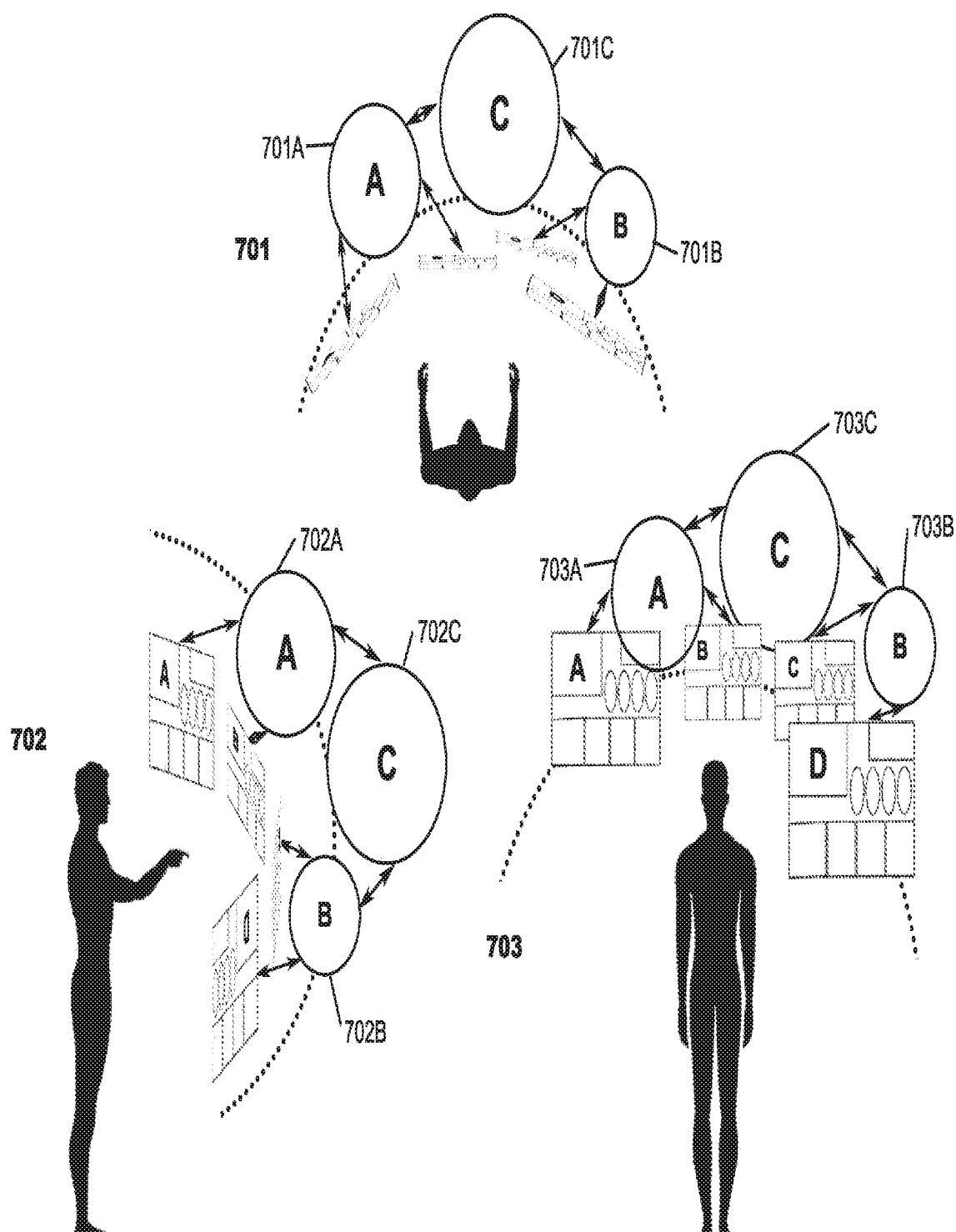
FIG. 7 illustrates an example of panel to container tethering in XYZ axial space.

FIG. 7 illustrates the combined view of both NMCs and NMPs and their spatial relationship to each other and the user(s). From the top view 701, the tethering between the parent containers and panels, 701A and 701B, shows an example of a direct nesting relationship, as well as an initial parent/child hierarchy. 701A and 701B are examples of nested children within 701C, which is an example of the overarching parental container. FIGS. 702 and 703 reflect this same hierarchical relationship from the right and front perspectives, whereas 702A, 702B, 703A and 703B are examples of the initial parent containers with respect to their nested NMPs, and 702C and 703C represent examples of the overarching parental container.

Figure 8:
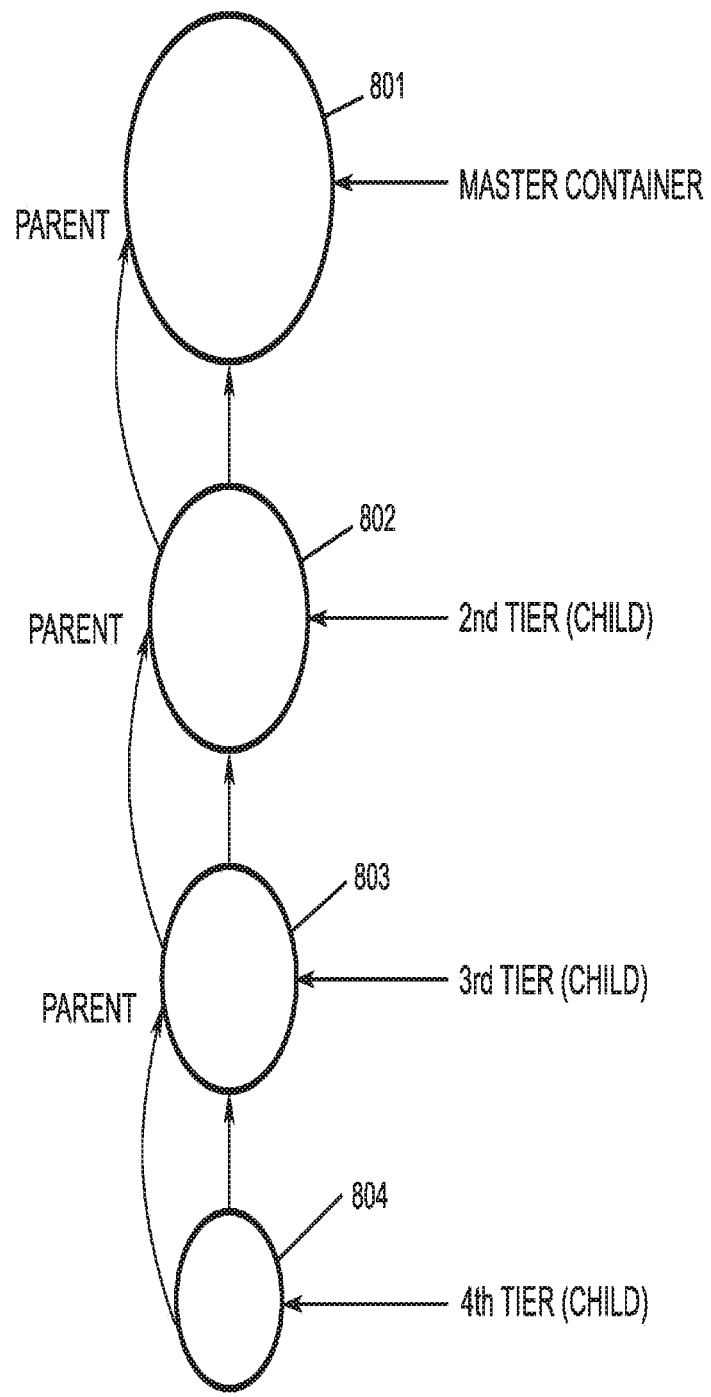
FIG. 8 illustrates the nesting of containers and how a container can be both a parent and child.

This system and its processes methods and/or procedures tracks, manages, manipulates and/or stores the hierarchical relationship of content that is embedded within a NMC or NMP. FIG. 8 illustrates an example of the nesting methods, processes and/or protocols for both containers and/or panels, and how each generation and/or level of nesting can inherit the parental and/or child role. 801 shows the top most container, or Master Container, which has the highest level in the hierarchical stack. 802 shows the $2^{nd}$ tier child which nests within the parent container 801. 803 shows a $3^{rd}$ tier child where 802 has now become the parent to that container. 804 shows a $4^{th}$ tier child where 803 has now become the parent to that container. This nesting process can waterfall down to indefinite levels.

Figure 9:
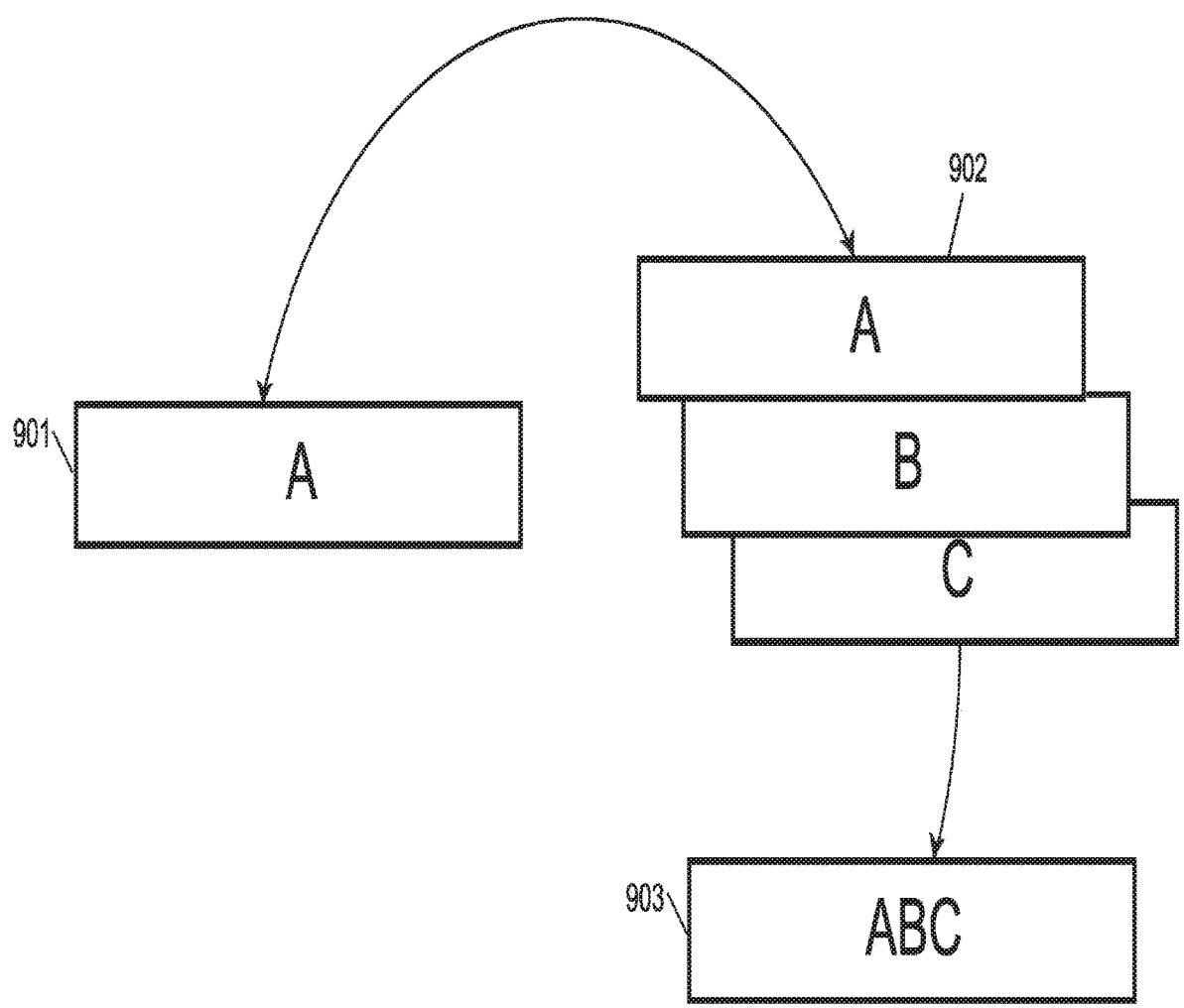
FIG. 9 Illustrates drag & drop nesting.
Figure 10:
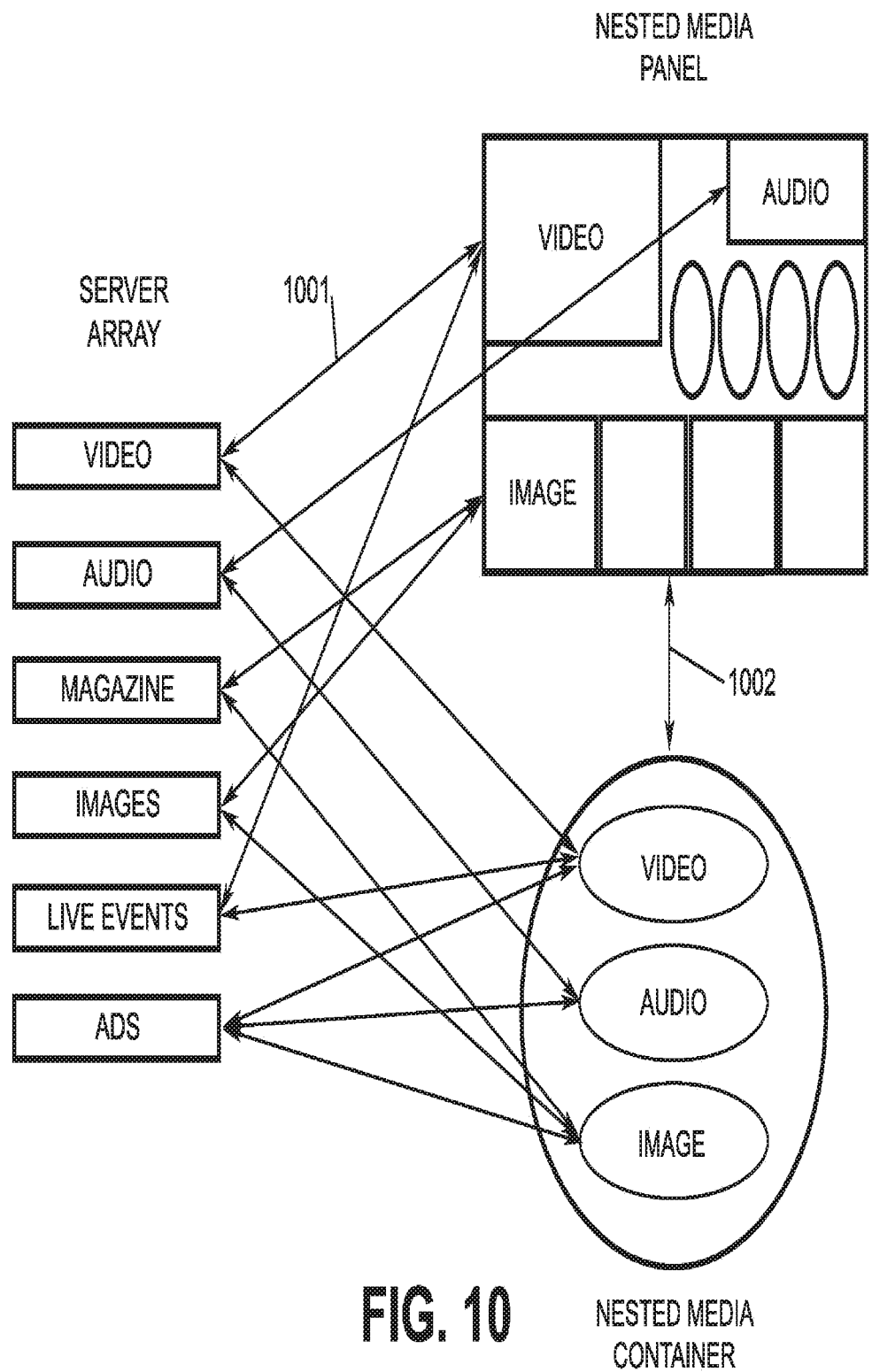
FIG. 10 illustrates drag & drop content validation.
Figure 11:
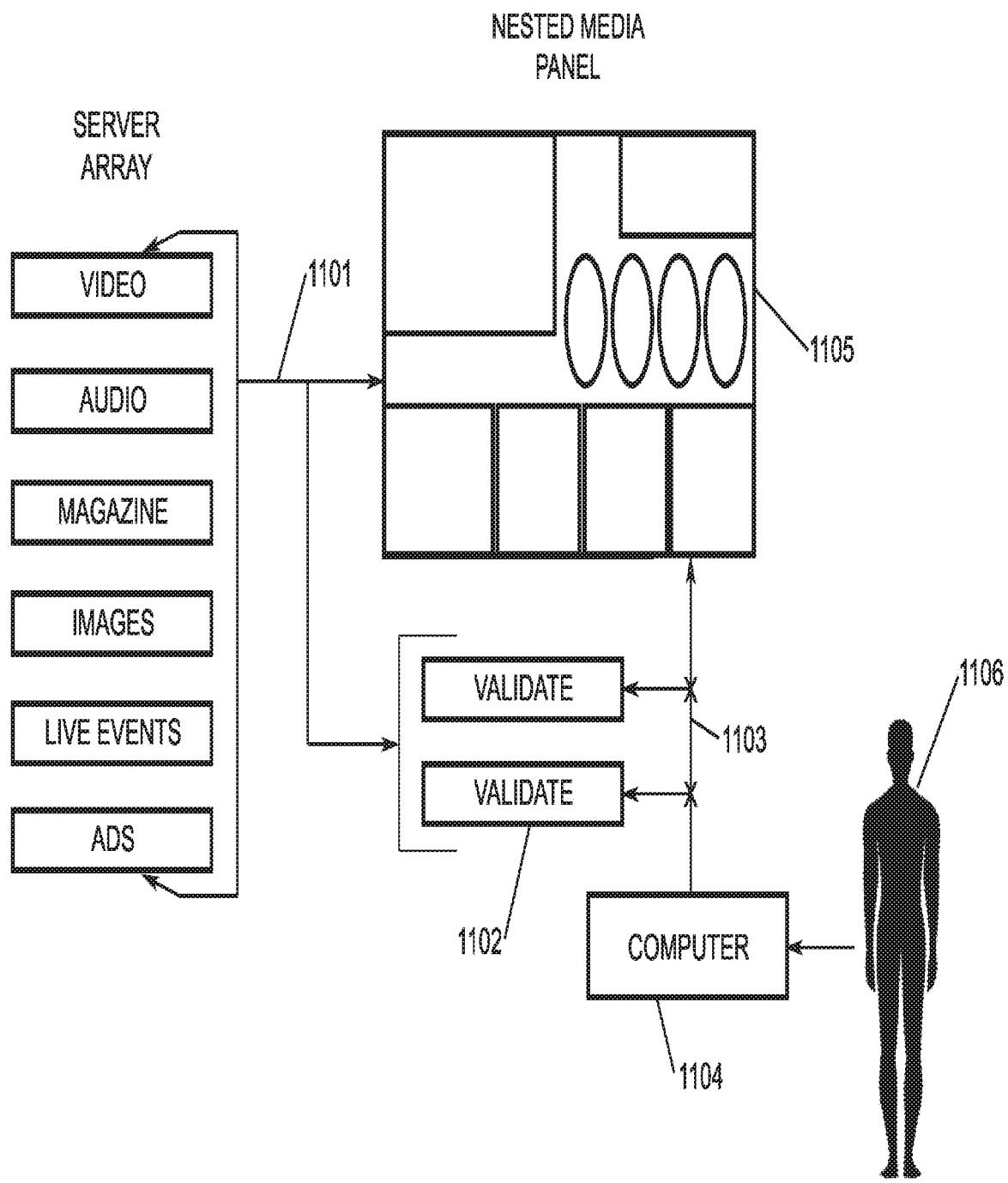
FIG. 11 illustrates the methods and process in which a nested media panel has embedded anti-piracy protocols.

Content, within the embodiment of this invention, held either in a NMC or NMP, can be dragged and dropped into a hierarchical stack. FIG. 9 illustrates an example of a piece of content and/or data 901 being dragged into a content array and/or stack 902 in which multiple pieces of content and/or data are then combined 903 into a new content snapshot. Any content and/or data, when originated from the server array FIG. 1, can also be dragged and dropped into a NMC or NMP as described in FIG. 10. This process includes a protocol, process and/or method for data validation which creates a constant metadata tether 1001 between the nested content and the server. This validation, both direct and indirect 1002, virtual and physical, allows for real-time and/or pre authentication of each piece of content and/or data as it is being shown. The implementations of this protocol create a distinct, virtual and/or organic anti-piracy method as illustrated in FIG. 11, in which the segmented tethered content 1101 is stitched together with a container or panel 1105. This is the only point at which all the elements of the content are in a single viewable location. As a user 1106 accesses the viewable content, a multistep validation process 1102 constantly checks the outgoing data/meta-data 1103, as it relates to the content and/or data, and takes an IP snapshot of the computer or device, virtual or physical, being used to access the content and/or data 1104. This method, process, procedure and/or protocol allows for a combined content and/or data view, but as soon as a prospective content pirate tries to extract, or rip, the content data, they would only be accessing snippets of content from the server array. Since the tethering process is handled dynamically, the pirate would have a hard time trying to re-stitch together the content into an outside format or container that held the same, or similar, dynamic content and metadata. This method, process, procedure and/or protocol includes the ability to track the pirate's movements and/or attempts to illegally secure the content and/or data, in essence, leaving a distinct digital fingerprint which can be tracked throughout its movement and lifetime.

Figure 12:
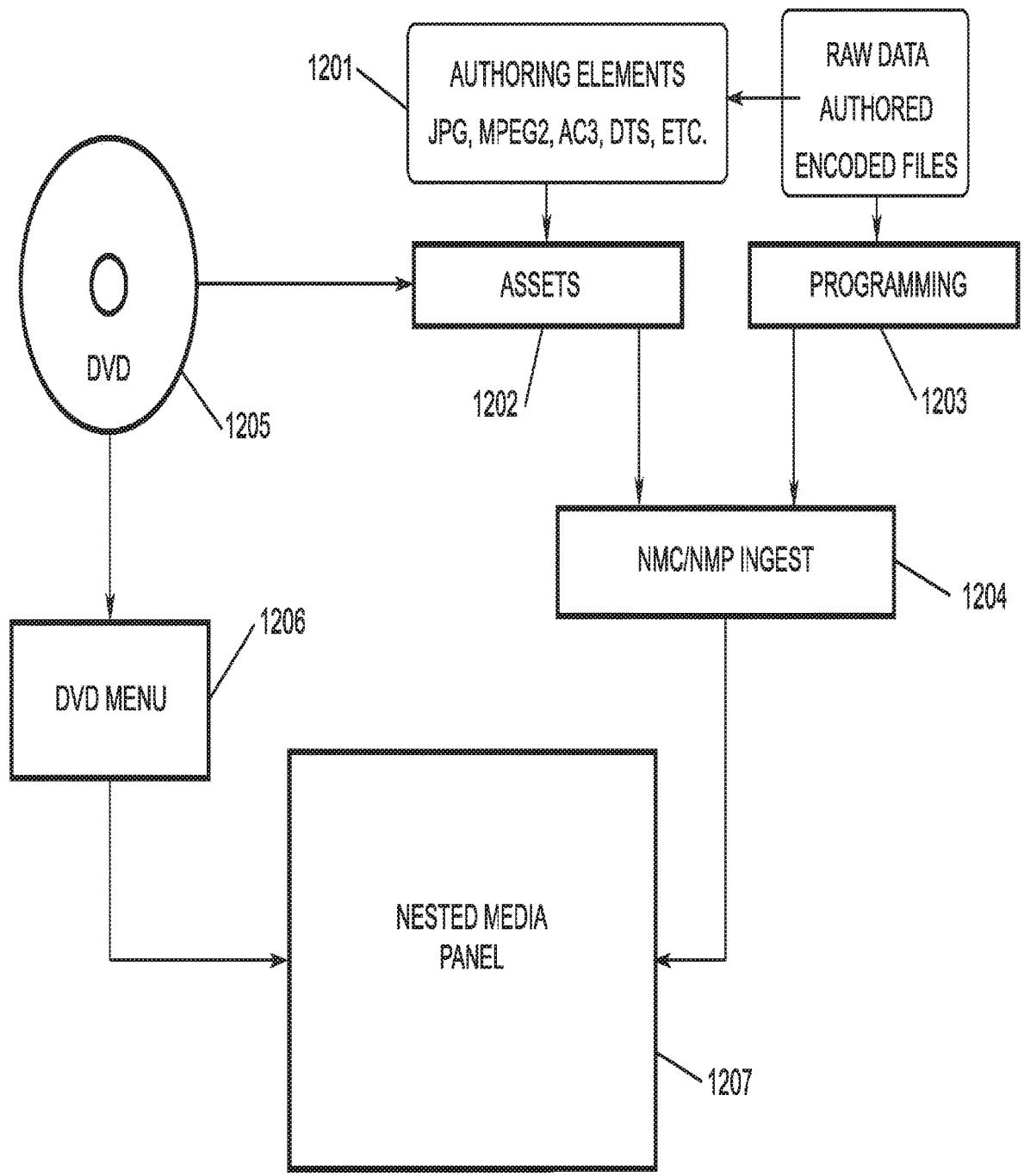
FIG. 12 illustrates the process of ingesting legacy digital media formats which carries over content, data, menus and functionality into a nested media panel.

There are many physical and virtual digital legacy formats, including, but not limited to, DVDs, Blu-Rays. HD DVD, CD-Roms and optical based mediums, in which content is authored into an interactive environment. The methods, processes procedures and/or protocols of this invention include, but are not limited to, legacy format ingest system(s) in which any content and/or data that has been authored into a unified medium can be extracted, manipulated, ingested and/or stored, whether pushed or pulled, into a NMC or NMP through the server array. FIG. 12 illustrates this process in which authoring elements 1201 including, but not limited to, JPEG, MPEG 2 (all formats), AC3. DTS and any other format wrapper is ingested along with any other authoring assets 1202 and programming elements 1203, which can include, but is not limited to, GRPMs, JavaScript, Java code, highlight and button mapping data, video chapter breaks, button functionality, user functions, digital author signatures, pre and post commands and any other program data that relates to authored content. The NMC/NMP ingest 1204 process, for example, can take a DVD 1205 and menus 1206 and reorganize that data into an NMC or NMP 1207 so that the same, or enhanced, functionality and content from the originating DVD are carried into the container and/or panel. This process and method allows for a unified virtual portable digital content format that can be, but not limited to, moved, migrated, transferred, transported, affected, manipulated, managed and/or stored as either a container and/or panel into any virtual or physical device, between devices and/or users based upon authentication protocols described herein and/or defined by the content owner.

Figure 13:
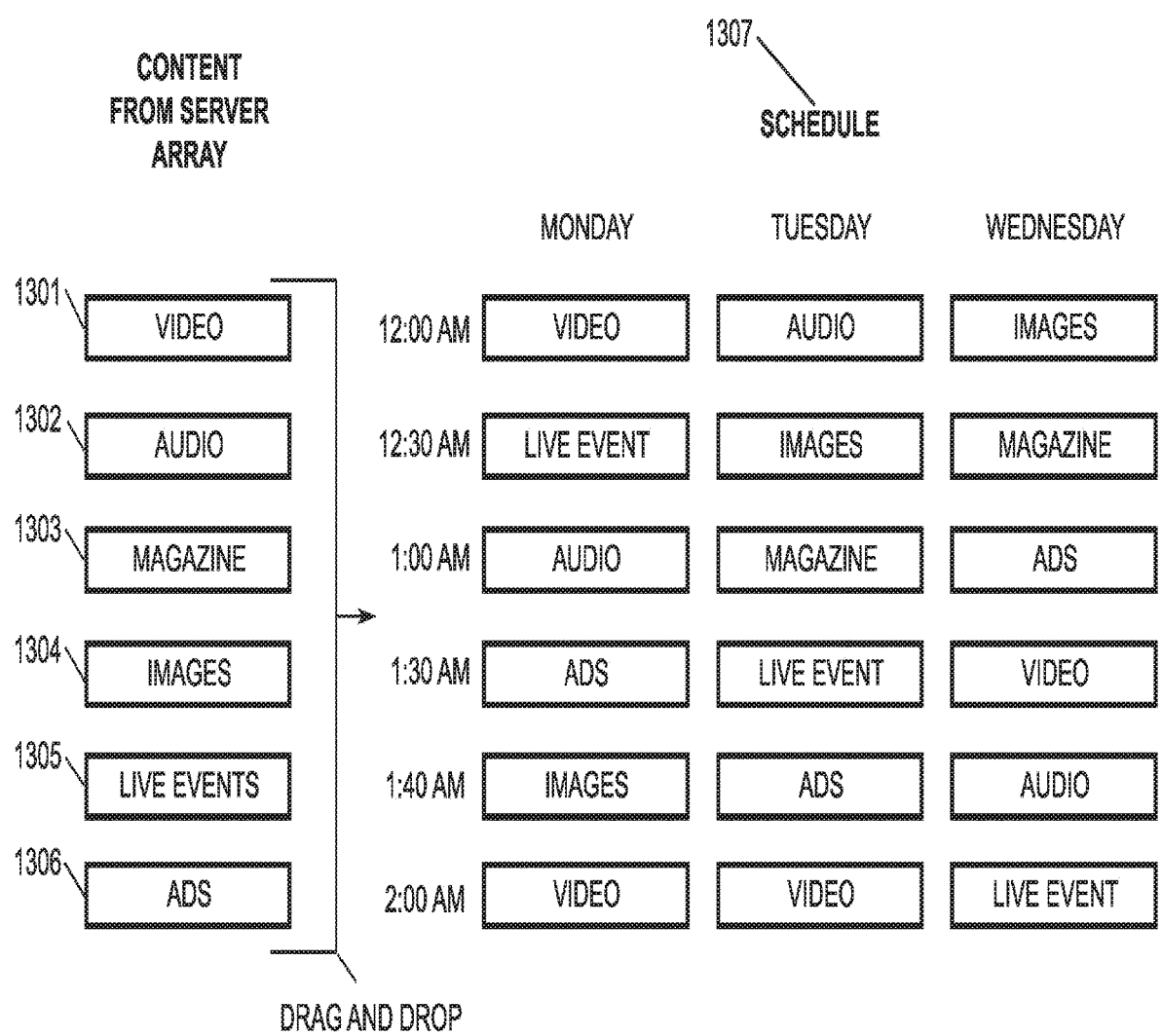
FIG. 13 illustrates an example of the drag & drop scheduling system.

The programming of content is handled through a method of drag and drop scheduling as illustrated in FIG. 13. This is an example of where any content asset type, 1301-1306, can be dynamically dragged and dropped into a live, or pre-programmed, play-out schedule 1307. This scheduler can play, in succession, different content types, including, but not limited to video, audio, live events, images (as still, galleries, or galleries with audio), advertisements, magazines (with or without video and/or audio content) and any other form of content and/or data. Content and/or data can be swapped or changed up to seconds before going live.

Figure 14:
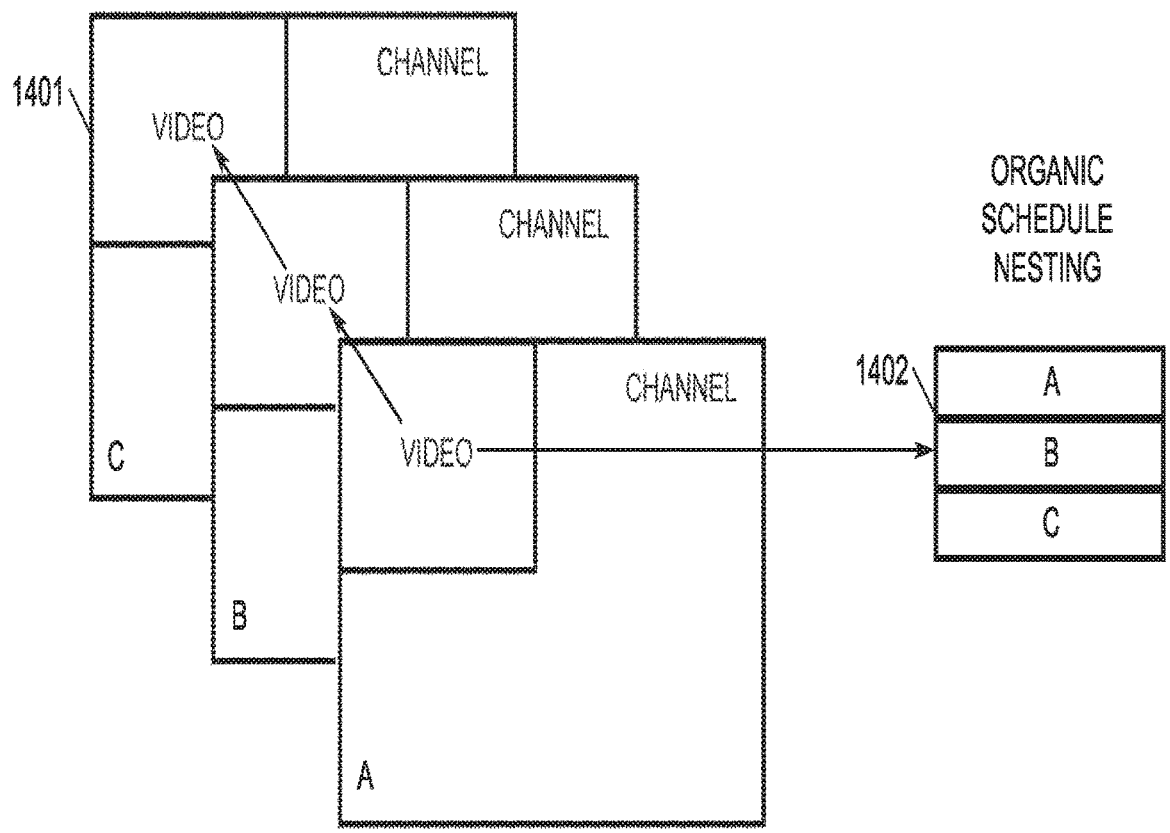
FIG. 14 illustrates hierarchical data and content management based on nesting.
Figure 15:
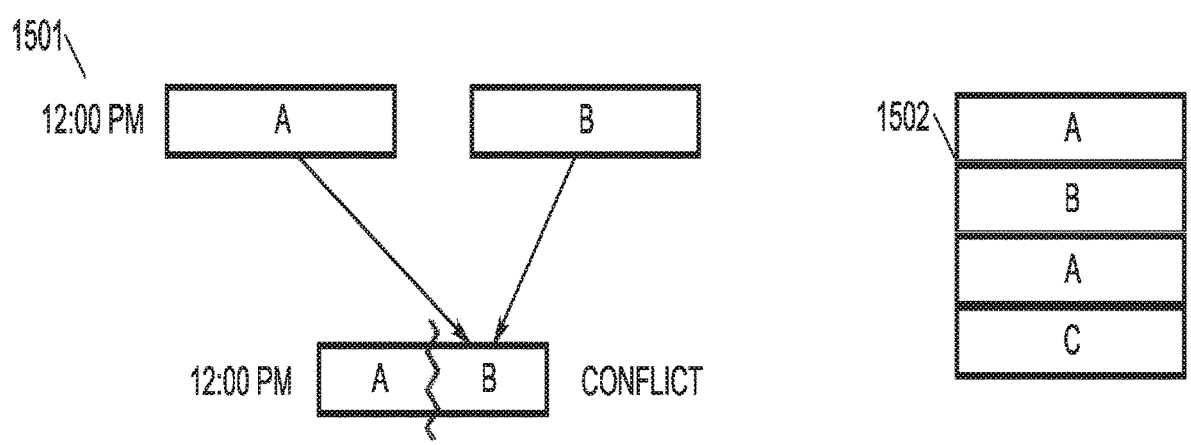
FIG. 15 illustrates schedule validation and content schedule conflict resolution.

Play-out schedules can also be organically created as illustrated in FIG. 14. This example shows how multiple containers or panels 1401, once nested or sub-nested, can created an aggregate schedule 1402 of the content and/or data that is held within each NMC or NMP. If there are any scheduling conflicts, as illustrated in FIG. 15, in which two or more content programs 1501 share the same time schedule, the system can suggest alternate times, suggest on-demand content which they can schedule when they choose to replace one or more of the conflicts, or give the user a choice of what content to omit and what to accept into their custom schedule 1501.

Figure 16:
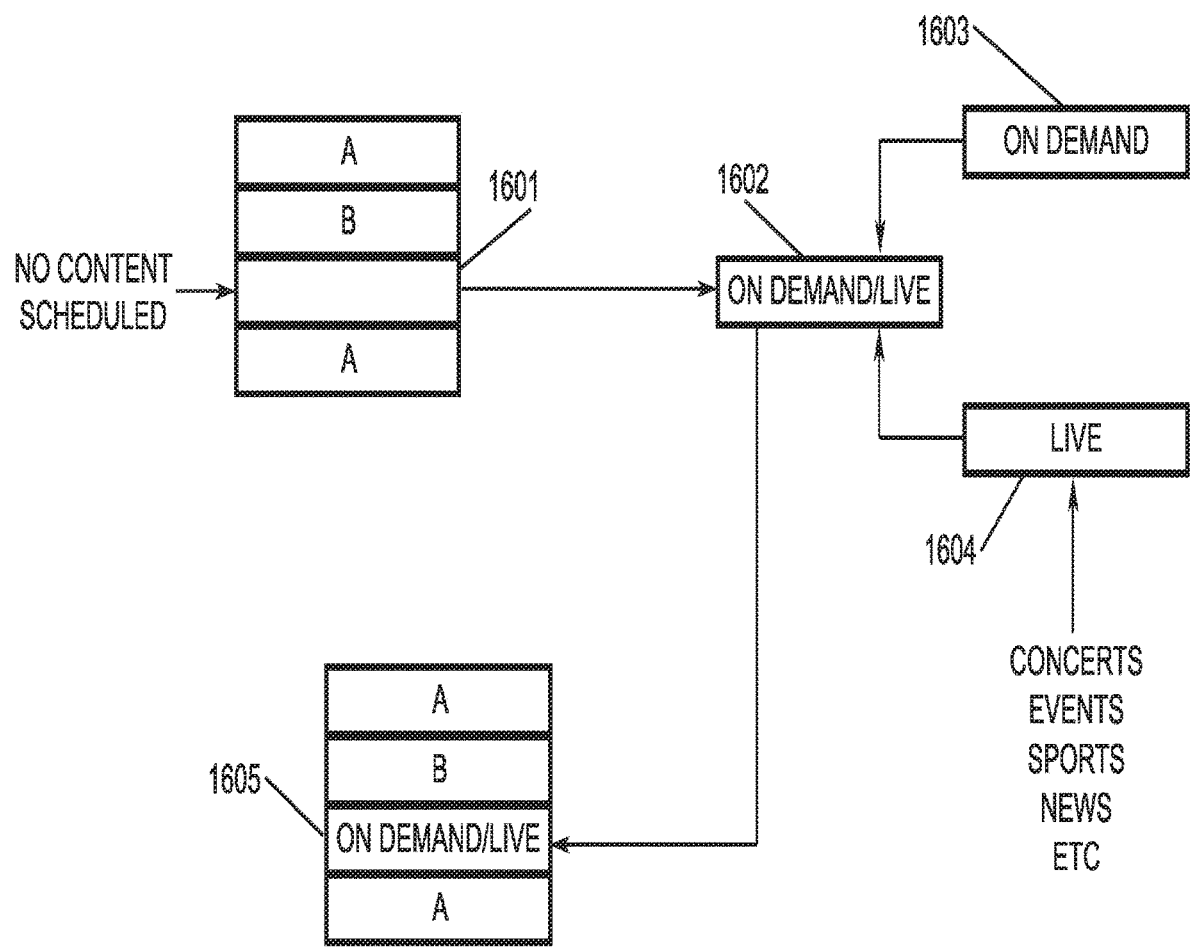
FIG. 16 illustrates how on-demand and live content can be embedded into an active schedule.

FIG. 16 illustrates an example of how on-demand and live content can be embedded into an active schedule.

Users can drag and drop live and/or on-demand events/content and/or data into the scheduling system as illustrated in FIG. 16. Where a schedule 1601 may be made up of content and/or data that can be stored on the server array or content that is sourced or stored outside of the array can be inserted into the schedule. Examples like on-demand 1603 and live events/content 1604 are ported through a virtual or physical scheduling container 1602, which can then be embedded into any schedule, panel and/or container 1605 that the user has security access to. Giving flexibility and numerous options for anyone scheduling content for their NMCs or NMPs. This is extremely useful for communities, both virtual and physical, and/or organizations that prefer to communicate, move or behave in sync with each other. This includes the scheduling system's ability to notify user, users, community, organizations and/or social groups about upcoming content schedules within a pre-defined and/or organic timeframe and/or sequence.

Figure 17:
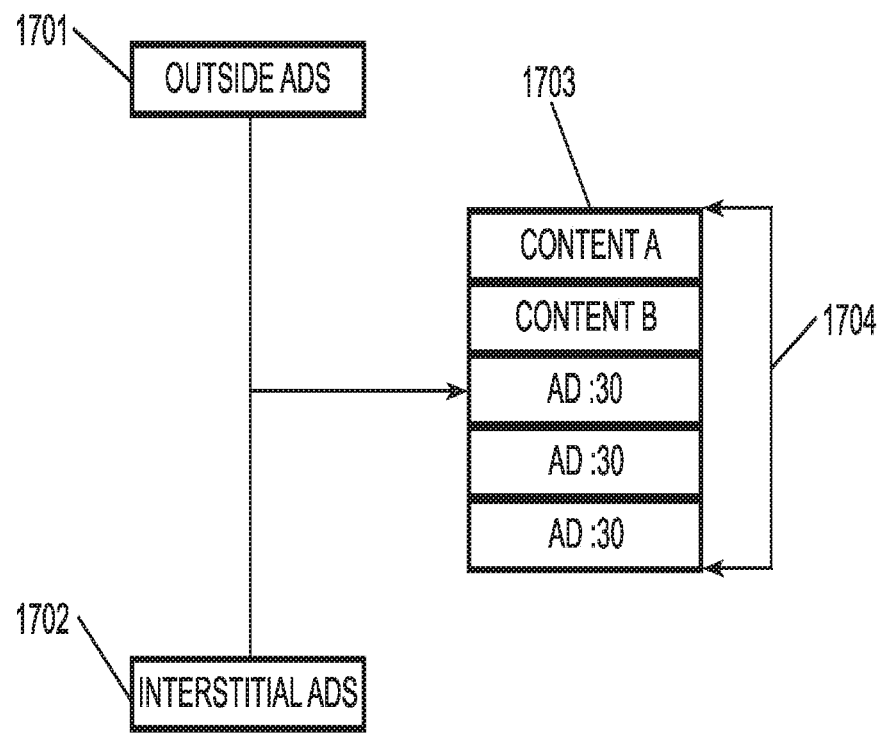
FIG. 17 illustrates automatic adjustment of available time, within a schedule, when embedding advertising.

Much like FIG. 16, where outside content and/or data can be embedded into a schedule, FIG. 17 illustrates automatic adjustment of available time, within a schedule, when embedding advertising or any other form of marketing. Where internal or external ads 1701, which is example of any advertisements that are not held within a user's container or panel, as well as any interstitial ads 1702, which includes, but is not limited to any content advertisements within a user's channel, container and/or panel, content advertisement within an outside user's channel, container and/or panel and any other source of interstitials when added to a schedule 1703 automatically adjust the time available 1704 for additional content or advertisement to be added. The managing user of that schedule will be notified of any remaining time available.

Figure 18:
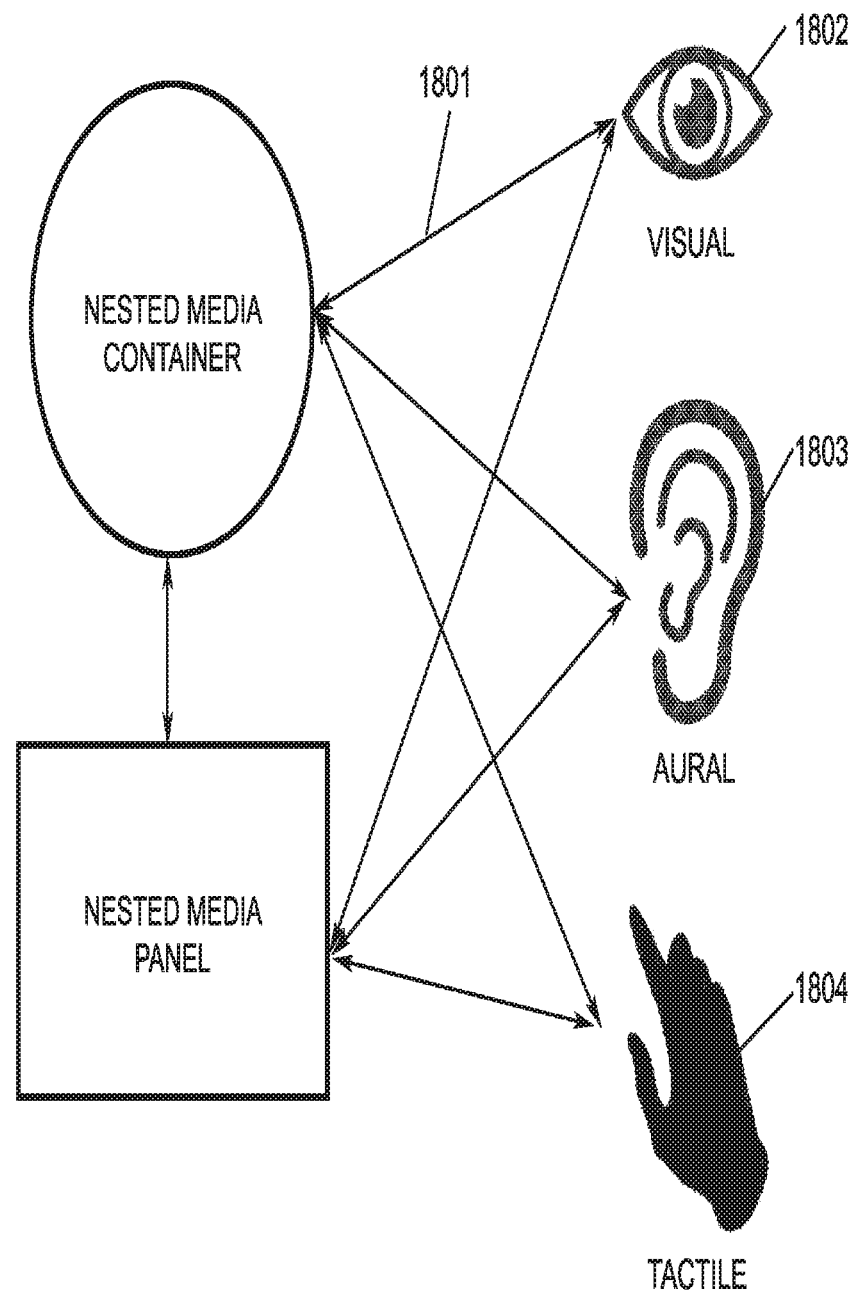
FIG. 18 illustrates various methods of user control and sensatory feedback from nested media panels and containers.

FIG. 18 illustrates various methods of user control and sensatory feedback to and/or from NMCs and NMPs. 1801 illustrates the two-way communication between an NMC and/or NMP and a user's control and feedback via sensatory responses. These can include, but are not limited to, visual 1802, aural 1803, tactile 1804 and any other interactive sensatory control and feedback method, solution, process and/or procedure that is known or is developed in the future.

Figure 19:
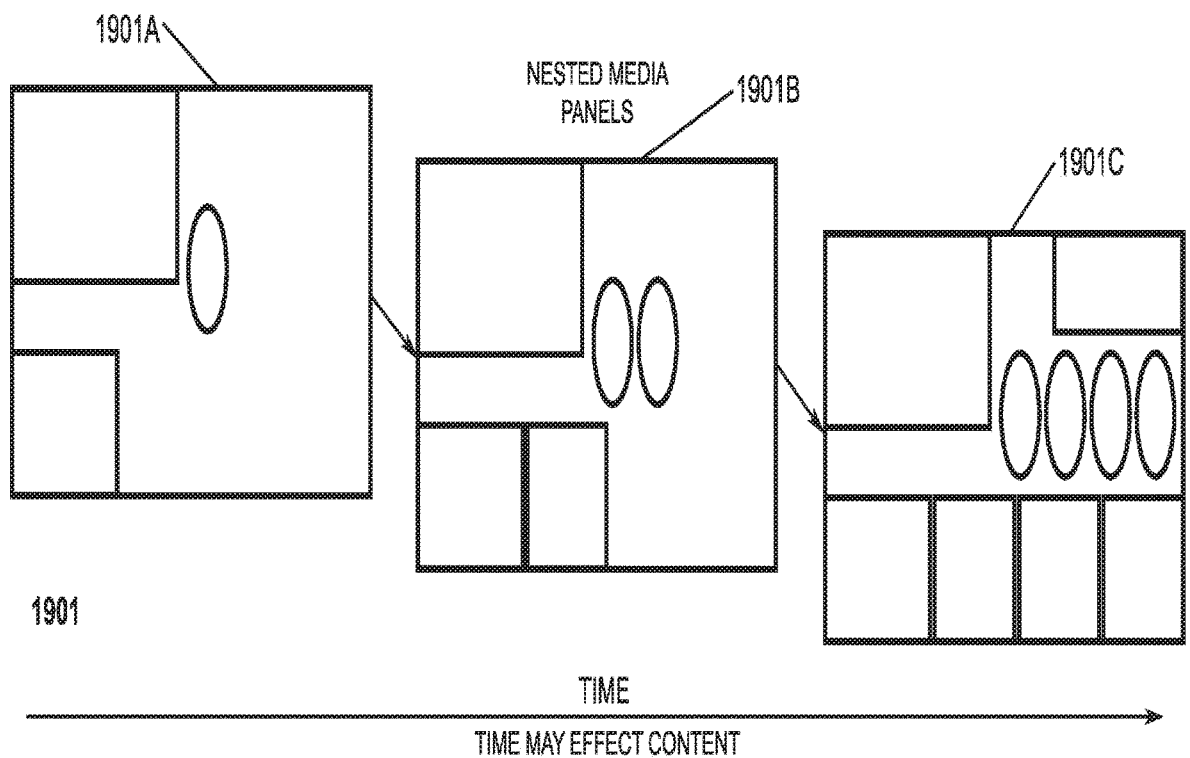
FIG. 19 illustrates the effects of time on content that is nested in a panels and/or container.
Figure 19:
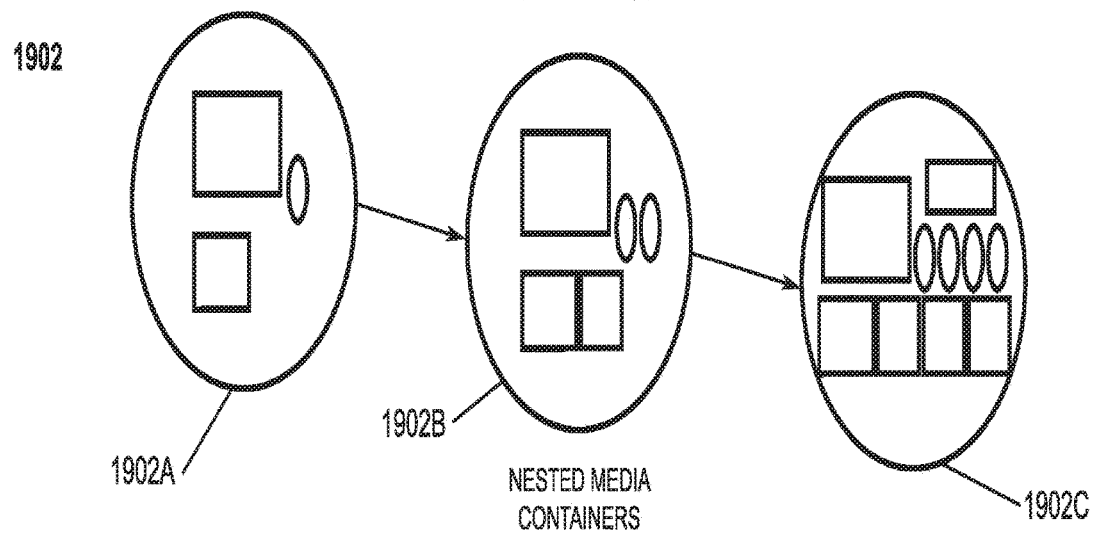

Time can affect any content and/or data that is held within a NMC or NMP as illustrated in FIG. 19. These effects on an NMP 1901 can include, but are not limited to visual shifts of content and/or data, addition or subtraction of content, reorganization of content and/or merger of content. 1901A-1901C shows examples of content and/or data additions over time. The same time variants affect NMCs 1902 in the same fashion, where 1902A-1902C illustrates content and/or data additions over time.

Figure 20:
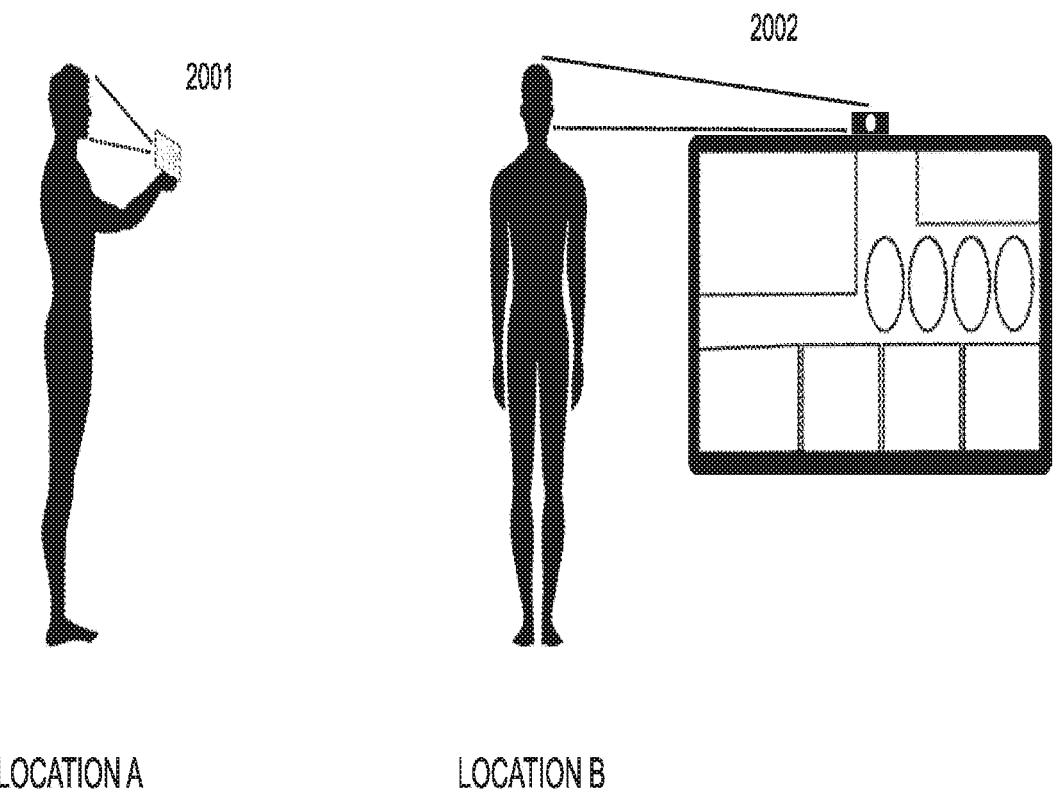
FIG. 20 illustrates accessing content through a panel or container from multiple locations using biometric authentication.

NMCs and NMPS, when accessed from different virtual, physical and/or altered locations, can have biometric, or other forms, of individual authentication as illustrated in FIG. 20. In this example a user in location A 2001 is viewing an NMC or NMP via a mobile device in which they are authenticated using optical recognition technology. There are many modes and methods of biometric authentication including, but not limited to, optical recognition, thumbprint, DNA, bio-feedback, human body frequency fall-off and many other developed and as-yet to be developed methods, processes, procedures and protocols. Any or all of these methods, processes, procedures and protocols can be used to authenticate access to an NMP and/or NMC from any location that has access the server array, including, but not limited to internet, intranet, extranet, wi-fi and/or Bluetooth. 2002 shows an example of a second location, location B, in which a user is authenticated visually through a smart television.

Figure 21:
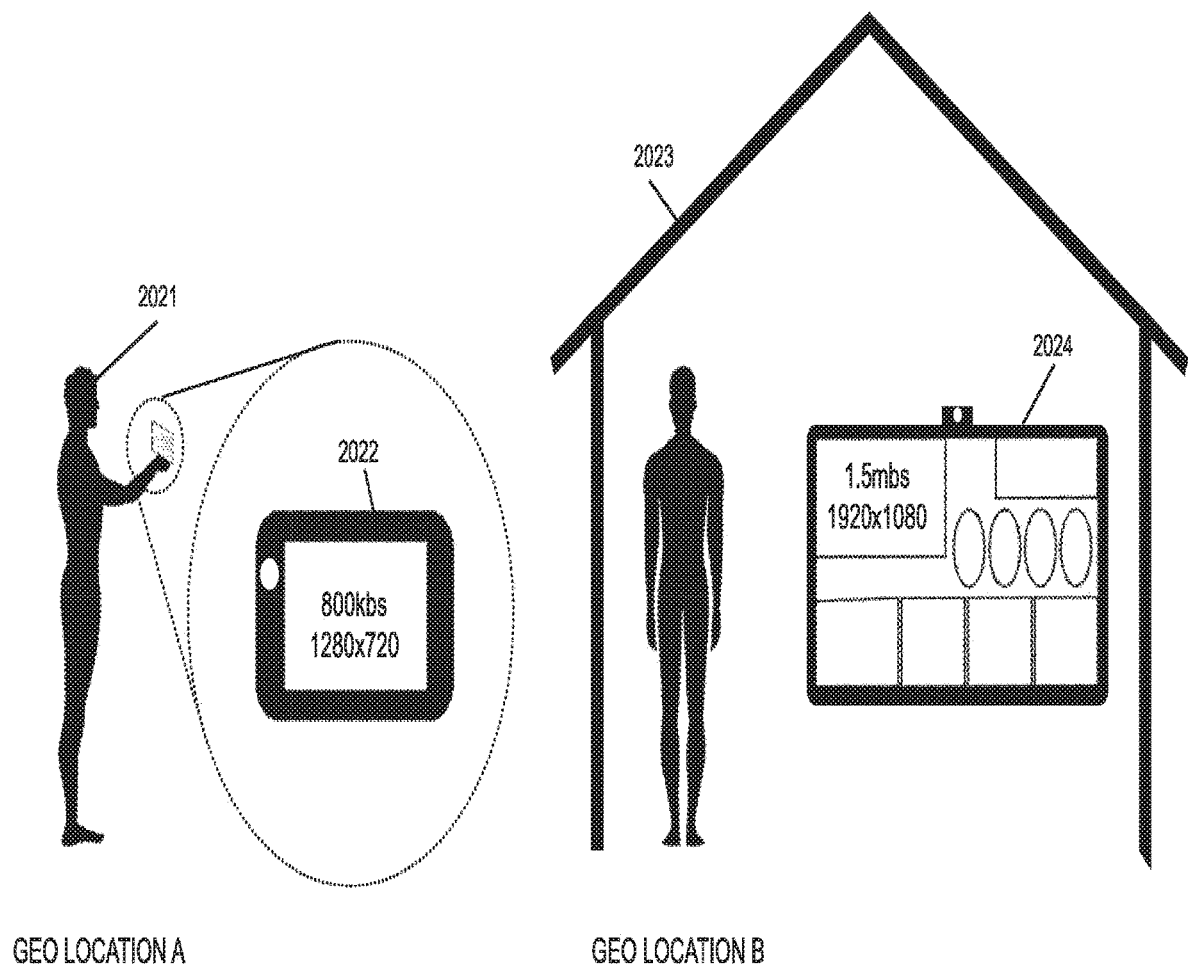
FIG. 21 illustrates location based resolution and bandwidth changes based on the different devices in the same or different locations.

FIG. 21 illustrates an example of location based resolution and bandwidth changes based on different devices in the same or different locations. Where a user at geo location A 2021 will see content through an NMC or NMP which automatically adjusts the resolution and bitrate to be optimized for both the device being used 2022 to view and content and the available bandwidth to that device at the time of viewing. Geo location B 2023 represents a second location, in this case a home, in which the device where the NMC and/or NMP being viewed is on a larger format smart TV 2024.

Figure 22:
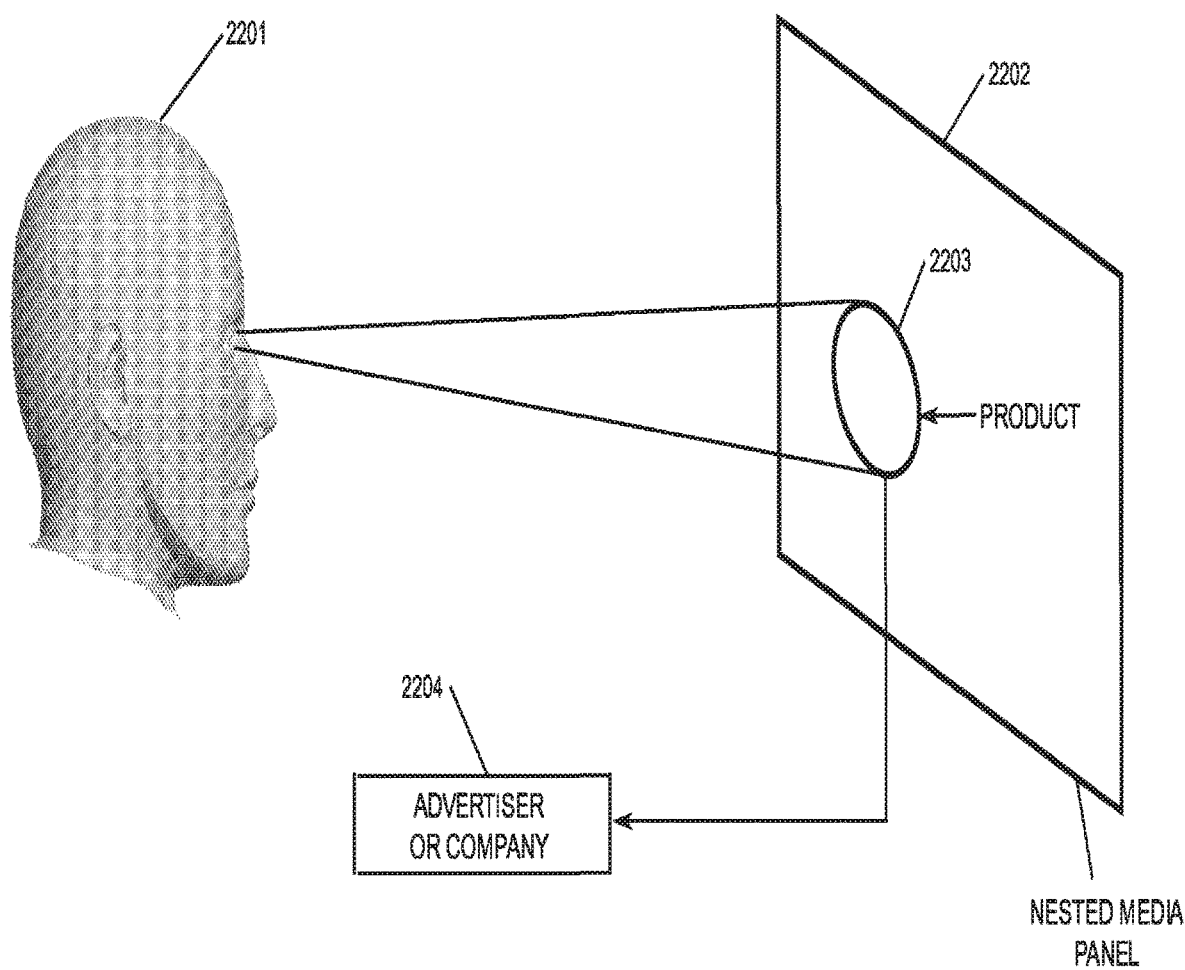
FIG. 22 illustrates ocular responsive advertising where real-time data feedback is sent to advertisers on what a viewer is focused on and for how long.

The responsive methods FIG. 22 gives an example of ocular responsive advertising where real-time data feedback is sent to advertisers 2204 on what a viewer 2201 is focused on 2202 and for how long. This method, process, procedures and protocol of real-time responsive feedback allows a more organic process for advertisers and companies when making critical market and consumer based decisions, and allows them to adjust and effect changes back to the device 2202 in which the user is viewing the content. This can include, but is not limited to, aural, tactile, optical, audible and/or any other sensatory capture method. This also allows for multiple viewers to be identified and tied to their viewing habits, as well as track how long they are actively or inactively viewing the content.

Thus, specific embodiments and applications of the inventive subject matter have been disclosed. It should be apparent, however, to those skilled in the art that many more modifications besides those already described herein are possible without departing from the inventive concepts herein. The inventive subject matter, therefore, is not to be restricted except in the spirit of the appended claims.

What is claimed:

1. An apparatus, comprising:
   one or more memory configured to store:
      a hierarchy of nested media containers comprising:
         one or more nested media containers, each nested media container comprising:
            an indication of a content location provided by content storage, wherein the content location indicates a location of content data;
            a set of metadata describing the content data, the set of metadata including a content type of the content data; and
            a set of links to nested media containers; and
         a plurality of nested media panels, each nested media panel configured with instructions to contextually render, based at least in part on the content type, a three-dimensional context, and linked nested media containers:
            at least one nested media container, wherein the three-dimensional context includes a depth placement into a combined panel; and
   one or more processors configured to:
      determine, based on the set of metadata and links to nested media containers, an association with a nested media panel for each of the one or more nested media containers; and
      render and tether, in the three-dimensional context into the combined panel created from the one or more nested media panels, a user interface, the rendering comprising to:
         traverse the hierarchy of the one or more nested media containers;
         select, based on a nested media panel for each node of the hierarchy; and
         contextually render and tether each node of the hierarchy, into the combined panel and in the three-dimensional context and based on instructions configured by an associated nested media panel and the set of metadata from an associated nested media container, and content data indicated by each nested media container in the hierarchy.

2. The apparatus of claim 1, wherein the hierarchy of the nested media containers comprise a tree.

3. The apparatus of claim 1, wherein the three-dimensional context is virtual reality or augmented reality.

4. The apparatus of claim 1, wherein the hierarchy indicates a placement relative to a Z-axis.

5. The apparatus of claim 1, wherein to determine the association with nested media panel for each of the one or more nested media containers further comprises to perform the determining at runtime.

6. The apparatus of claim 1, wherein the one or more processors are further configured to:
add an additional nested media container within the hierarchy; and
render, in the three-dimensional context, an altered user interface to incorporate additional content data indicated by the additional nested media container.

7. The apparatus of claim 1, wherein the one or more processors are further configured to receive input from a user based on tactile control, motion control, optical control, audible control, or gesture control.

8. A computer program product comprising a computer-readable storage medium that stores instructions for execution by a processor to perform operations of a nested media panel rendering system, the operations, when executed by the processor, to perform a method, the method comprising:
determining, based on a set of metadata and links to nested media containers, an association with a nested media panel from a set of nested media panels to a nested media container within a hierarchy, wherein:
each nested media container comprises:
an indication of a content location provided by content storage, wherein the content location indicates a location of content data,
a set of metadata describing the content data, the set of metadata including a content type of the content data, and
a set of links to nested media containers,
each nested media panel configured with instructions to contextually render, based at least in part on the content type, a three-dimensional context, and linked nested media containers:
at least one nested media container, wherein the three-dimensional context includes a depth placement into a combined panel;
traversing the hierarchy of the nested media containers;
select, based on a nested media panel for each node of the hierarchy; and
rendering and tethering, in the three-dimensional context into the combined panel created from the one or more nested media panels, a user interface, comprising:
contextually rendering and tethering each node of the hierarchy, into the combined panel and in the three-dimensional context and based on instructions configured by an associated nested media panel and the set of metadata from an associated nested media container, and content data indicated by each nested media container in the hierarchy.

9. The computer program product of claim 8, wherein the traversing the hierarchy further comprises determining an association for each nested media container in the hierarchy to a nested media panel.

10. The computer program product of claim 8, wherein the three-dimensional context is virtual reality or augmented reality.

11. The computer program product of claim 8, wherein rendering and tethering further comprises modifying, based on the hierarchy of a second nested media container being a descendant of a first nested media container, content data associated with the first nested media container.

12. The computer program product of claim 11, wherein the modifying further comprises modifying at least one three-dimensional coordinate component of the first nested media container.

13. The computer program product of claim 12, wherein the at least one three-dimensional coordinate component is a Z-space component.

14. The computer program product of claim 8, wherein the method further comprises receiving input from a user based on tactile control, motion control, optical control, audible control, or gesture control.

15. A method of rendering content data indicated by nested media containers in a three-dimensional context, the method comprising:
determining, based on a set of metadata and links to nested media containers, an association with a nested media panel from a set of nested media panels to a nested media container within a hierarchy, wherein:
each nested media container comprises:
an indication of a content location provided by content storage, wherein the content location indicates a location of content data,
a set of metadata describing the content data, the set of metadata including a content type of the content data, and
a set of links to nested media containers,
each nested media panel configured with instructions to contextually render, based at least in part on the content type, a three-dimensional context, and linked nested media containers:
at least one nested media container, wherein the three-dimensional context includes a depth placement into a combined panel;
traversing the hierarchy of the nested media containers;
select, based on a nested media panel for each node of the hierarchy; and
rendering and tethering, in the three-dimensional context into the combined panel created from the one or more nested media panels, a user interface, comprising:
contextually rendering and tethering each node of the hierarchy, into the combined panel and in the three-dimensional context and based on instructions configured by an associated nested media panel and the set of metadata from an associated nested media container, and content data indicated by each nested media container in the hierarchy.

16. The method of claim 15, wherein the three-dimensional context is virtual reality or augmented reality.

17. The method of claim 15, wherein the method further comprises receiving input from a user based on tactile control, motion control, optical control, audible control, or gesture control.

18. The method of claim 15, wherein the user interface further comprises a two-dimensional projection of a three-dimensional user interface.

19. The method of claim 15, the method further comprises rendering, based on the hierarchy, a first user interface element associated with first content data closer relative to a Z-axis than a second user interface element associated with second content data.

* * * * *